(12) United States Patent
Andrus et al.

(10) Patent No.: US 11,613,313 B2
(45) Date of Patent: Mar. 28, 2023

(54) DEPLOYABLE FAIRING FOR TRANSPORT VEHICLE

(71) Applicant: ANDRUS RESEARCH INC., Ancaster (CA)

(72) Inventors: Paul G. Andrus, Ancaster (CA); Gayle R. Campbell-Andrus, Ancaster (CA); Michal Ryszard Bielejewski, Hamilton (CA)

(73) Assignee: ANDRUS RESEARCH INC., Ancaster (CA)

( * ) Notice: Subject to any disclaimer, the term of this patent is extended or adjusted under 35 U.S.C. 154(b) by 211 days.

(21) Appl. No.: 17/094,276

(22) Filed: Nov. 10, 2020

(65) Prior Publication Data

US 2021/0139086 A1     May 13, 2021

Related U.S. Application Data

(60) Provisional application No. 62/933,770, filed on Nov. 11, 2019.

(51) Int. Cl.
*B62D 35/00* (2006.01)
*B62D 37/02* (2006.01)
*B62D 53/06* (2006.01)

(52) U.S. Cl.
CPC .......... *B62D 35/001* (2013.01); *B62D 37/02* (2013.01); *B62D 53/06* (2013.01)

(58) Field of Classification Search
CPC .... B62D 35/001; B62D 35/004; B62D 35/00; B62D 37/02; B62D 53/06
See application file for complete search history.

(56) References Cited

U.S. PATENT DOCUMENTS

| | | | |
|---|---|---|---|
| 2,737,411 A | 3/1956 | Potter | |
| 4,427,229 A * | 1/1984 | Johnson | B62D 35/004 |
| | | | 52/2.18 |

(Continued)

FOREIGN PATENT DOCUMENTS

| | | |
|---|---|---|
| DE | 19940376 A1 | 3/2001 |
| DE | 102009014860 A1 | 10/2010 |

(Continued)

OTHER PUBLICATIONS

European Search Report for 20206807.8-1009 / 3842323, dated Oct. 7, 2021, 17 Pages.

(Continued)

*Primary Examiner* — Lori L Lyjak
(74) *Attorney, Agent, or Firm* — Pearne & Gordon LLP

(57) ABSTRACT

A deployable fairing for a transport vehicle comprises a flexible, internally pressurizable enclosure supported by a structural frame. The structural frame comprises a plurality of rigid structural members forming at least two subframes that are pivotally coupled to one another and is foldably movable between a collapsed configuration and an expanded configuration. The enclosure moves with the structural frame, unfolds when the structural frame moves into the expanded configuration and folds in upon itself when the structural frame moves into the collapsed configuration. Moving the structural frame into the expanded configuration develops tension on at least part of the outer surface of the enclosure, and movement of the structural frame into the collapsed configuration releases the tension. When the enclosure is internally pressurized while the structural frame is in the expanded configuration, the outer surface of the enclosure is structurally stiff and conforms to a predefined aerodynamic shape.

19 Claims, 36 Drawing Sheets

(56) References Cited

U.S. PATENT DOCUMENTS

| | | | | |
|---|---|---|---|---|
| 4,601,508 A | * | 7/1986 | Kerian | B62D 35/004 296/180.4 |
| 4,688,841 A | | 8/1987 | Moore | |
| 4,702,509 A | * | 10/1987 | Elliott, Sr. | B62D 35/004 137/543 |
| 4,707,015 A | * | 11/1987 | Klomfass | B62D 35/004 296/180.4 |
| 4,741,569 A | * | 5/1988 | Sutphen | B62D 35/004 296/180.4 |
| 4,978,162 A | | 12/1990 | Labbe | |
| 5,058,945 A | * | 10/1991 | Elliott, Sr. | B62D 35/001 296/180.1 |
| 5,236,347 A | | 8/1993 | Andrus | |
| 6,407,252 B1 | | 6/2002 | Bellani et al. | |
| 6,467,833 B1 | | 10/2002 | Travers | |
| 6,666,498 B1 | | 12/2003 | Whitten | |
| 8,087,715 B2 | | 1/2012 | Andrus et al. | |
| 8,336,950 B2 | | 12/2012 | Andrus et al. | |
| 8,550,539 B1 | | 10/2013 | Anderson | |
| 9,051,013 B1 | * | 6/2015 | Popa | B62D 35/004 |
| 9,971,356 B2 | | 5/2018 | Smith et al. | |
| 10,137,945 B2 | | 11/2018 | Burrows et al. | |
| 2009/0212594 A1 | | 8/2009 | Breidenbach | |
| 2010/0231000 A1 | * | 9/2010 | Andrus | B62D 35/001 296/180.4 |
| 2010/0231001 A1 | * | 9/2010 | Mracek | B62D 35/004 296/180.4 |
| 2012/0001451 A1 | | 1/2012 | Breidenbach | |
| 2013/0057019 A1 | | 3/2013 | Breidenbach | |
| 2014/0035317 A1 | | 2/2014 | Anderson | |
| 2014/0346807 A1 | | 11/2014 | Breidenbach | |
| 2016/0137235 A1 | | 5/2016 | Breidenbach | |
| 2016/0214660 A1 | * | 7/2016 | Conny | B62D 35/001 |
| 2017/0096179 A1 | * | 4/2017 | Wall, II | B62D 35/001 |
| 2017/0158260 A1 | | 6/2017 | Breidenbach | |
| 2018/0015966 A1 | * | 1/2018 | Tongue | B62D 35/001 |
| 2019/0092401 A1 | * | 3/2019 | Prakash | B62D 35/001 |

FOREIGN PATENT DOCUMENTS

| | | | | |
|---|---|---|---|---|
| FR | 2509681 A1 | | 1/1983 | |
| GB | 2148207 A | * | 5/1985 | B60R 19/20 |
| WO | 2010112204 A1 | | 10/2010 | |

OTHER PUBLICATIONS

European Search Report for 20206807.8-1009, dated Jun. 1, 2021, 8 Pages.
Marlene Hartner, Jurgen Hildebrand, "Vibrations in Automotive Radar Systems", Robert Bosch GmbH, Chassis System Control—Driver Assistance, 2016, 4 pages 2016 IEEE NTT-S International Conference on Microwaves for Intelligent Mobility.

* cited by examiner

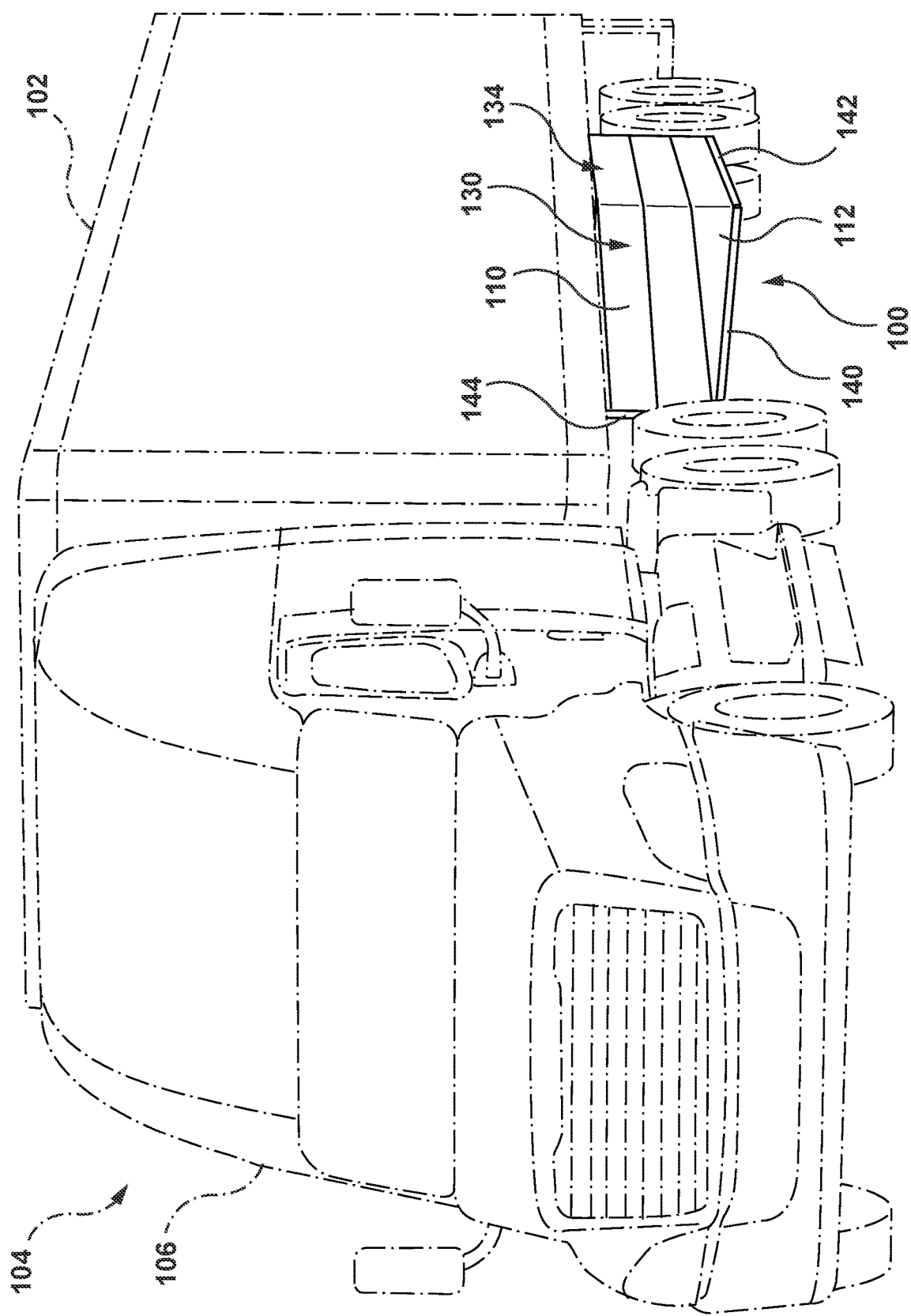

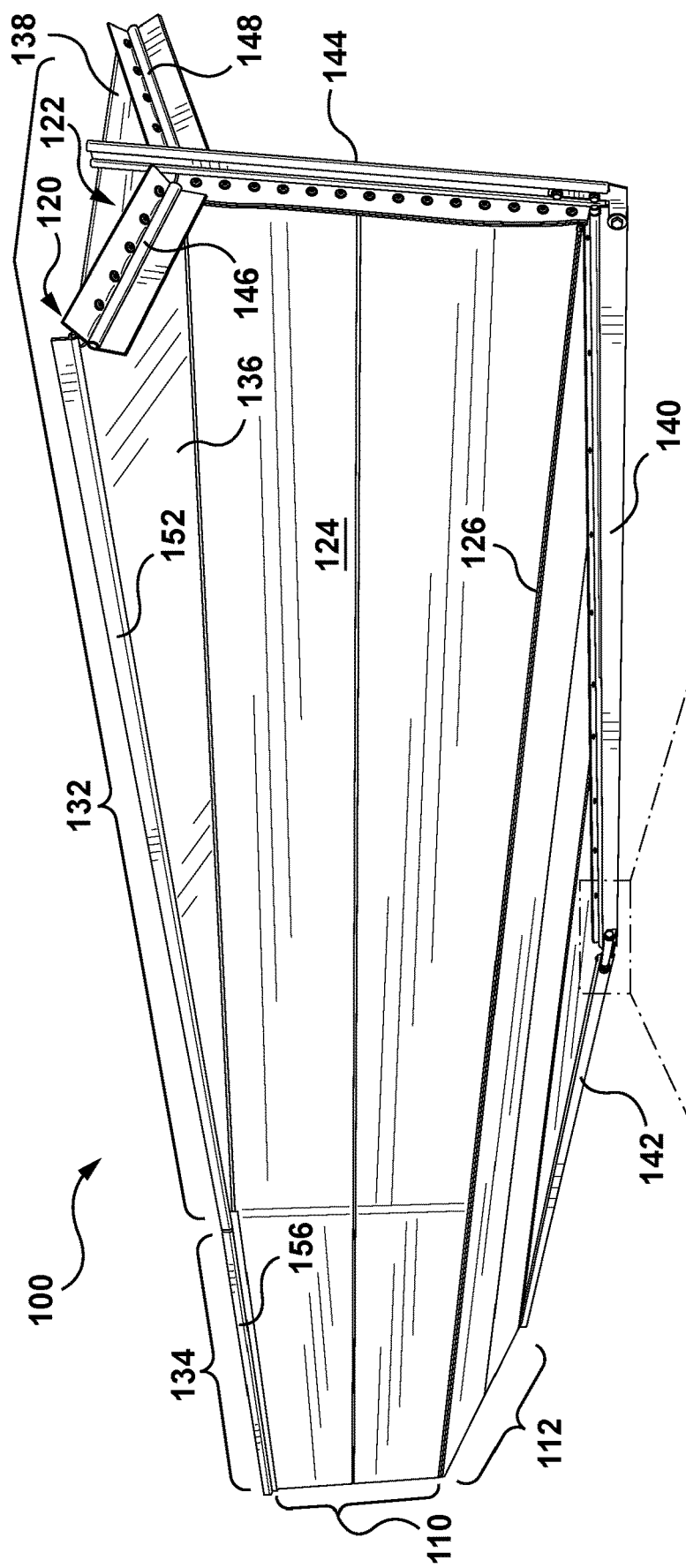
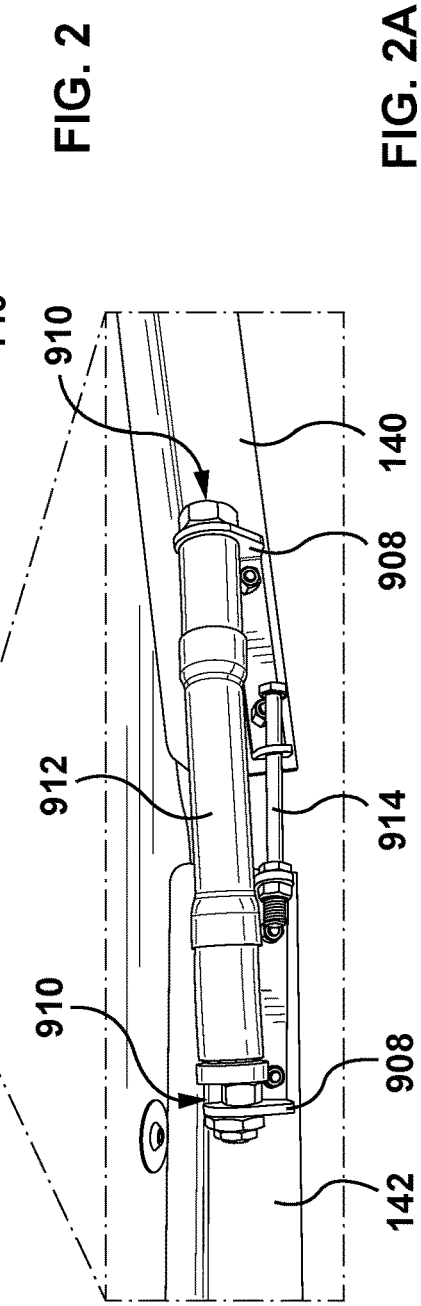
FIG. 2
FIG. 2A

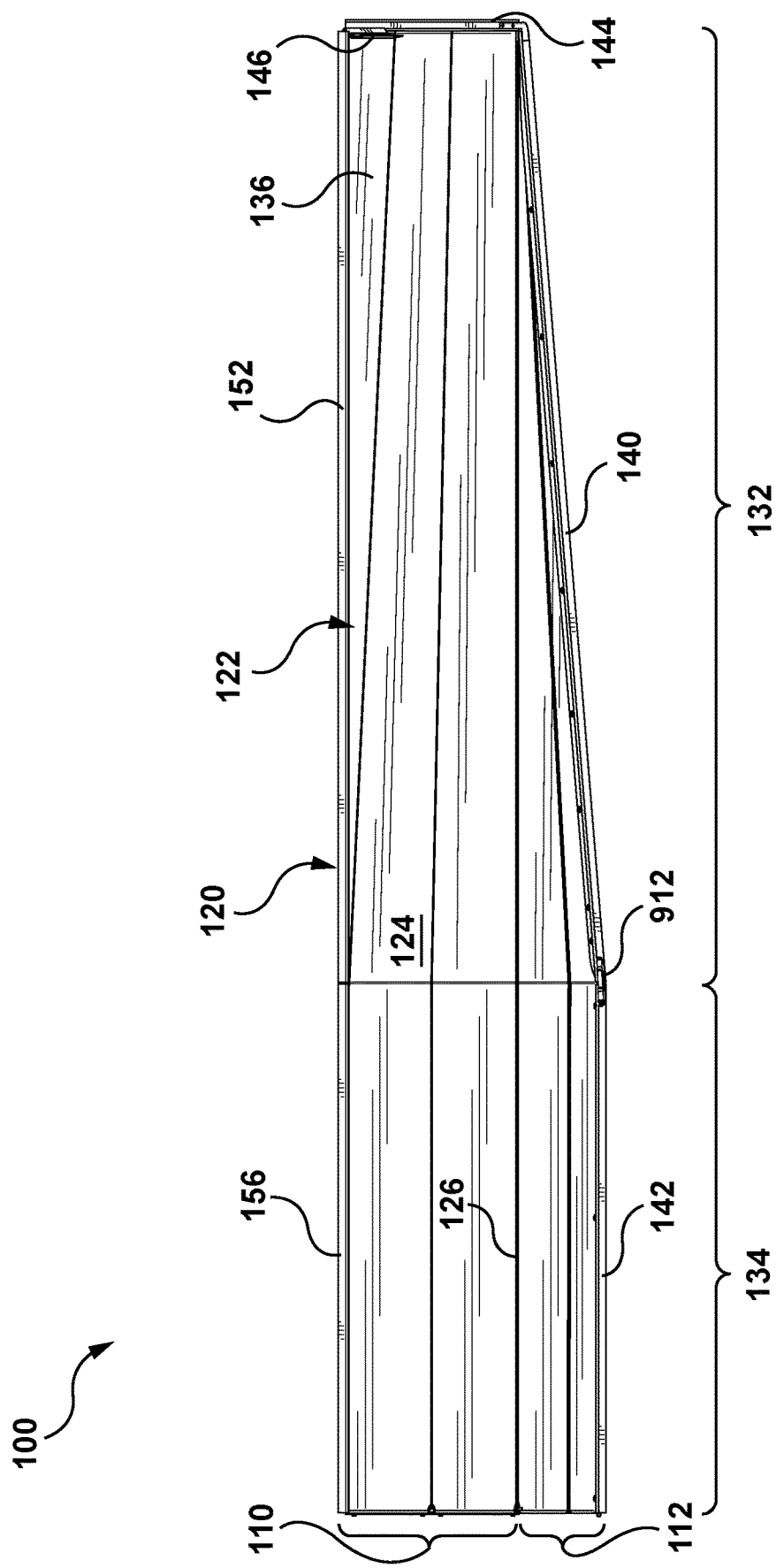

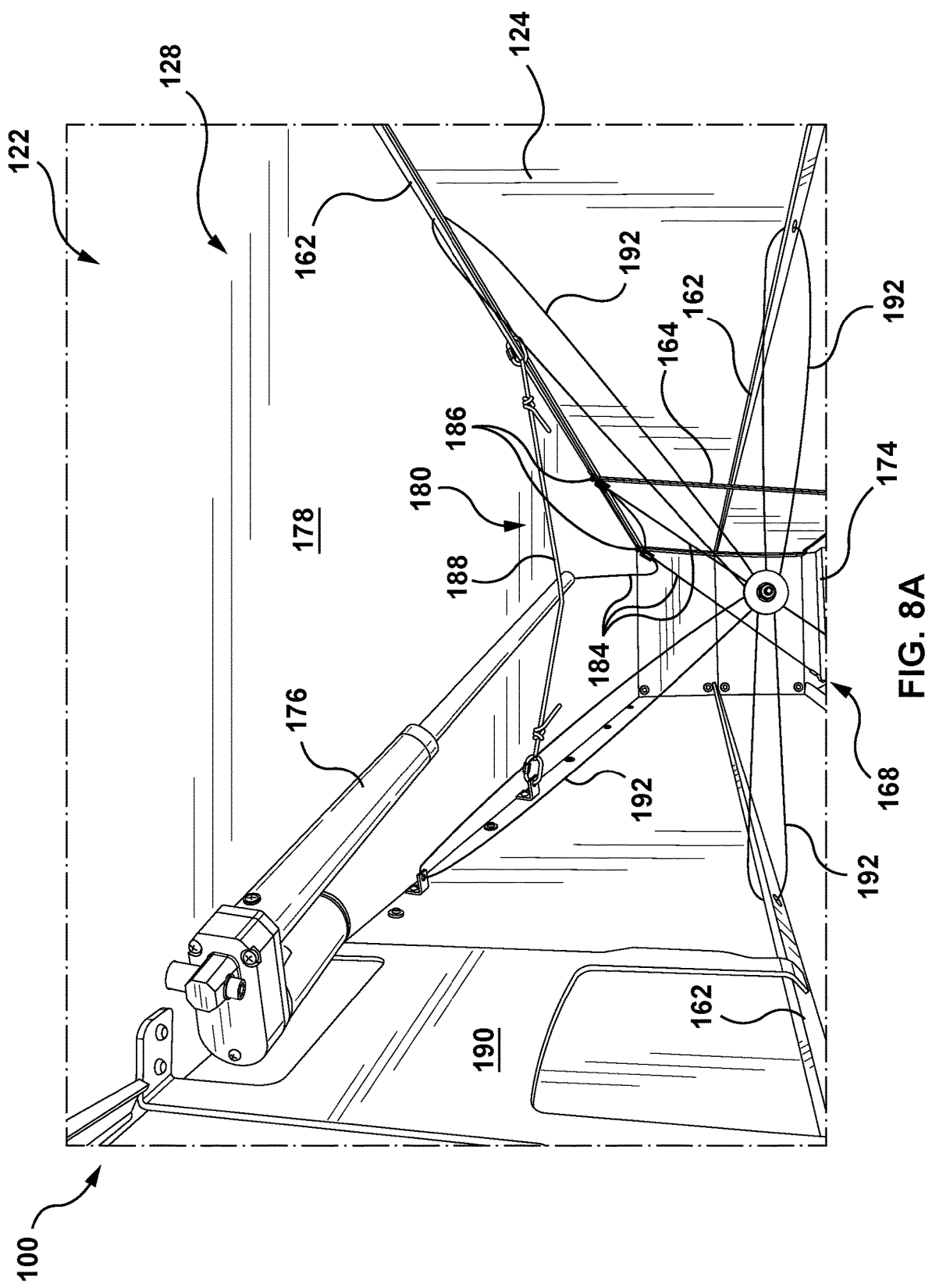

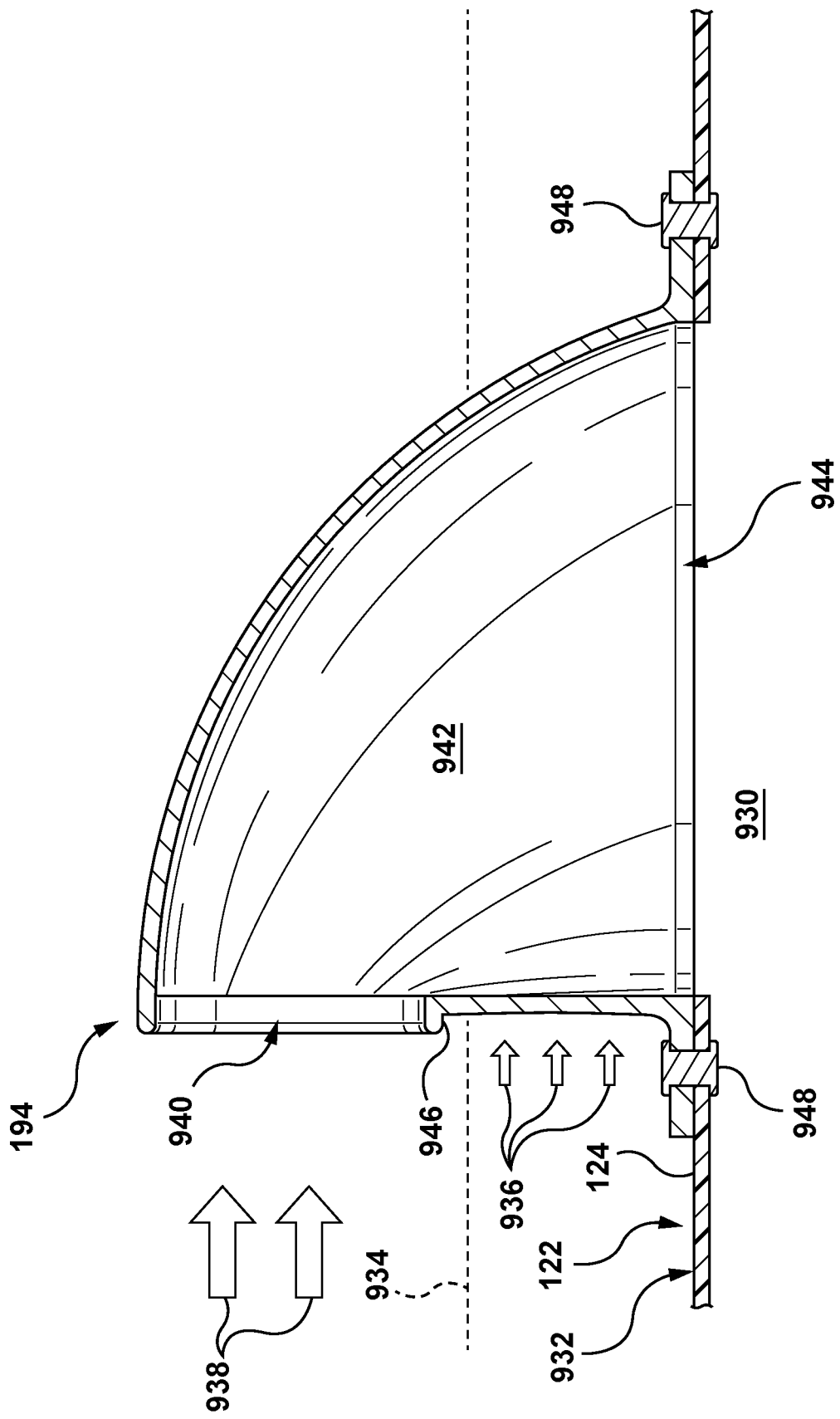

DEPLOYABLE FAIRING FOR TRANSPORT VEHICLE

CROSS-REFERENCE TO RELATED APPLICATIONS

This application claims priority to U.S. Provisional Application No. 62/933,770 filed Nov. 11, 2019, the teachings of which are hereby incorporated by reference.

TECHNICAL FIELD

The present disclosure relates to deployable fairings for transport vehicles such as trucks.

BACKGROUND

Composite rigid panel structures are commonly used for aerodynamic structures on trucks and trailers. An example of a panel-based structure for tractor-trailer gap closure having foldable rigid upper panels to bridge the cab trailing edge to the trailer leading edge is disclosed in U.S. Pat. No. 10,137,945 to Burrows. These types of rigid panel structures are relatively heavy yet still subject to shape alteration over time due to temperature cycles, and are also subject to vibration/oscillation particularly in crosswinds due to turbulent airflow.

Another type of aerodynamic structure takes the form of an inflatable bag that is internally reinforced by inelastic cords, for example as described in U.S. Pat. No. 6,409,252 to Andrus for a boattail embodiment and U.S. Pat. Nos. 8,087,715 and 8,336,950 to Andrus and Campbell-Andrus for a trailer skirt embodiment. While these arrangements represent an advancement, they remain subject to further improvement.

Automatic speed-sensitive control of aerodynamic devices has also come into use. Boattails (e.g. on the rear doors of a cargo trailer) should automatically stow before docking and automatically deploy on the highway. Skirts should ride low to the road on the highway for optimal fuel savings, yet have higher clearance during city driving and docking to avoid impact from docking ramps, snow banks, railway crossings, speed bumps, etc. Gap fairings (i.e. between a cab and a trailer) should also deploy on the highway yet retract at slow speed to allow tighter cornering and vertical articulation of the tractor-trailer over steep bumps or sudden inclined surfaces without upper edge cab-trailer contact. Speed-sensitive control of trailer aerodynamic devices is well known, and has been described, for example, in U.S. Pat. No. 5,236,347 to Andrus, which discloses an automatic boattail that is upwardly retracted at lower airspeed by elastic recoil counterbalanced by fluctuating ram-air pressure. U.S. Pat. No. 6,666,498 to Whitten and U.S. Pat. No. 9,971,356 to Smith et al. both disclose a boattail with an electronic speed sensor and controller to automate deployment.

Another challenge facing a developer of trailer aerodynamic devices relates to the mounting and connection of the device to the trailer. In the case of a boattail, a composite rigid panel device with only side and top panels (airflow surfaces) requires an air seal around its perimeter where it meets the trailer in order to retain recovered air pressure on the rear of the vehicle, in this case the rear doors. This type of boattail is referred to as a sealed aft cavity. If the perimeter is not sealed then the aerodynamic gains are compromised in proportion to the degree of air leak. An air seal for a panel boattail is difficult given projecting door hinges along the sides and other door hardware such as the lock rods along the top.

Another difficulty in the practical implementation of a boattail device is in maintaining continuity of the airflow surface from the trailer sides and roof to the boattail surfaces in the context of rearwardly projecting trailer door hinges which are mounted flush with the trailer side surface along this airflow pathway, and the need to allow a full 270 degrees of door opening without binding the boattail between the door and trailer side (which would prevent full door opening). Continuity of airflow surface is necessary to maintain attached airflow. If the air is allowed to separate at the boattail/trailer junction, then no boattail effect occurs. If the doors cannot be fully opened, then trailers cannot be effectively docked. If the boattail side is mounted onto the door inside the door hinge pins, then an airflow surface offset is created, and reattachment of the air onto the boattail after it leaves the trailing edge of the trailer becomes unreliable.

In the case of a trailer skirt, portability becomes relevant when considering that the position of the rear wheel bogie is commonly adjustable to accommodate axle loading distribution. Commonly, fixed panel skirts are mounted to extend rearwardly only as far as the 'wheels full forward' bogie position, so as not to ever interfere with this option. However, the wheels are more often set 4 to 6 feet behind this full forward position, leaving a 4 to 6 foot gap in front of the wheels and behind the skirt. This gap sacrifices about 20% of the potential fuel economy savings of the trailer skirt. The gap also renders the trailer skirt much less effective as a safety barrier for pedestrians and cyclists, who could easily tumble into the gap.

In the trailer skirt domain, there are two types of structures that are known to be useful and desirable. One is a safety guardrail, which would typically be positioned with its lower edge about 18 inches above the road and 24 inches below the lower side edge of the trailer. The other is an aerodynamic trailer skirt that is generally understood to have a maximum clearance of about 12 inches from the road and about 30 inches of height. Trailer skirt performance is directly proportionate to height, so a 39 inch tall skirt would perform about 30% better than a 30 inch tall skirt (length and fitting considerations being equal). However, any structure with less than about 18 inches of clearance is prone to ground contact at times during slow speed manoeuvers, given the long wheelbase of the trailer.

The problem of underride crashes along the sides and rear of transport trailers, and accidents involving under-running of large animals has previously been addressed by use of heavy barrier rails. This is an unsatisfactory solution, as such structures can weigh 800 to 1000 lbs. The added weight displaces payload, which then requires more transport miles driven with associated increased total crashes and fuel consumption. Such structures also interfere with trailer operation, and can compromise the structure of the trailer itself.

Thus, there are a number of significant deficiencies with current designs for truck and trailer aerodynamic systems, which are challenging to overcome.

SUMMARY

Broadly speaking, the present disclosure describes deployable fairings for a transport vehicle which, in various different embodiment, can be used as an aerodynamic structure for one or more of the gap between the cab and the transport trailer, the tail of the transport trailer (a boattail) and the underbody of a transport trailer (a trailer skirt).

The structure of the boattail and gap fairings can be essentially the same, and merely mounted on opposite ends of the trailer and facing in opposite directions. A gap fairing can be used to close the gap between combination trailers as well. The boattail and a shortened form of the trailer skirt can be deployed on straight trucks (i.e. where the cab and cargo container are integrated into single truck).

The fairings described herein comprise pressurized (e.g. by ram air) and partially framed extendable and retractable enclosures formed from fabric or another suitable flexible sheeting material. As will be described further below, the fairings are provided with features to tension/de-wrinkle the sheeting material that forms the enclosure to smooth and stabilize the aerodynamic surfaces and facilitate precise folding and stowage when retracted. The smoothing and stabilization of the aerodynamic surfaces can also enhance the signal transmission and reception for internal safety sensors such as radar or cameras. The frames are formed from internally hinged rigid structural members, with extension and retraction driven by one or more linear actuators to support automatic speed-regulated operation.

Within boattail and gap fairing embodiments, the frames may be configured to efficiently impart tension on the top surfaces of the enclosure when deployed and relax these surfaces for low stress folding when stowed, thereby avoiding the weight and complexity of hingedly folding rigid panels.

The trailer skirt embodiments may comprise an upper safety guard section that remains fixed in position and a lower aerodynamic section which retracts at slower speeds.

Fairings according to the present disclosure may be detachably (non-permanently) attached to the trailer to allow for quick removal of the boattail for maintenance access to the trailer doors, and to reposition the trailer skirt to match the wheel bogie position.

Trailer skirt embodiments of fairings according to the present disclosure may also provide an underride crash avoidance system through the use of translucent sheeting material and internal light sources to create conspicuity without distracting focal brightness.

In one aspect, a deployable fairing for a transport vehicle comprises an enclosure formed from flexible sheeting and a structural frame. The enclosure forms an outer surface and is adapted to be internally pressurized. The structural frame comprises a plurality of rigid structural members, and the structural frame comprises at least two subframes. The subframes are pivotally coupled to one another so that the structural frame is foldably movable between a collapsed configuration and an expanded configuration. An actuator acts between the subframes and is adapted to move the structural frame between the expanded configuration and the collapsed configuration. The enclosure is supported by and coupled to the structural frame so that the enclosure moves with the structural frame and unfolds when the structural frame moves from the collapsed configuration to the expanded configuration and folds in upon itself when the structural frame moves from the expanded configuration to the collapsed configuration. Movement of the structural frame from the collapsed configuration to the expanded configuration develops tension on at least a portion of the outer surface of the enclosure, and movement of the structural frame from the expanded configuration to the collapsed configuration releases the tension. When the enclosure is internally pressurized while the structural frame is in the expanded configuration, the outer surface of the enclosure is structurally stiff and conforms to a predefined aerodynamic shape.

In an embodiment, the structural frame comprises a rigid subframe adapted to be fixedly secured on the transport vehicle and a folding subframe that folds relative to the transport vehicle. In a particular embodiment, when the enclosure is internally pressurized while the structural frame is in the collapsed configuration, a portion of the outer surface of the enclosure surrounding the rigid subframe is structurally stiff and maintains conformity with its corresponding portion of the predefined aerodynamic shape.

In an embodiment, the enclosure is formed from a monolithic sheet.

In an embodiment, the actuator is configured to be responsive to a speed sensor.

In an embodiment, tensioning elements are interposed between adjacent rigid structural members for tensioning the enclosure. The tensioning elements may be adjustable tensioning elements.

In an embodiment, the sheeting is translucent and at least one light source is disposed within the enclosure for substantially uniformly illuminating the outer surface of the enclosure.

In an embodiment, at least one sensor element is carried by the enclosure. The sensor element(s) may be disposed within the enclosure.

In an embodiment, the rigid structural members are internally anchored by inelastic cords.

In one particular embodiment, the fairing is a boattail fairing. In such an embodiment, the rigid structural members comprise an inner mounting member and an outer mounting member. The inner mounting member is adapted for mounting onto a door of a trailer, and the outer mounting member is adapted for pivotal mounting onto a side of the trailer adjacent the door. When the fairing is mounted on the trailer, there is clearance between the door and the enclosure whereby the fairing is non-interfering with the operation of the door.

In another particular embodiment, the fairing is a trailer skirt. In such an embodiment, the fairing comprises an upper safety guard section comprising a first one of the subframes and which remains fixed in position relative to the transport vehicle, and a lower aerodynamic section comprising a second one of the subframes and which, relative to the upper safety guard section, retracts and extends.

In another aspect, the present disclosure is directed to a fairing for a transport vehicle. The fairing comprises an enclosure formed from flexible sheeting and forming an outer surface, and a structural frame. The enclosure is adapted to be internally pressurized, and the structural frame comprises a plurality of rigid structural members. The enclosure is supported by and coupled to the structural frame so that when the enclosure is internally pressurized, the outer surface of the enclosure is structurally stiff and conforms to a predefined aerodynamic shape. At least some of the rigid structural members are coupled to one another end-to-end by tensioning elements whereby those rigid structural members apply tension to the enclosure to de-wrinkle the sheeting.

In yet another aspect, the present disclosure is directed to a fairing for a transport vehicle. The fairing comprises an enclosure formed from flexible sheeting and forming an outer surface, and a structural frame. The enclosure is adapted to be internally pressurized, and the structural frame comprises a plurality of rigid structural members. A sensor element is carried by the enclosure. The enclosure is supported by and coupled to the structural frame so that when the enclosure is internally pressurized, the outer surface of the enclosure is structurally stiff and conforms to a predefined aerodynamic shape and is substantially free of airflow-induced vibration when the fairing is subjected to turbulent airflow.

In still yet another aspect, the present disclosure is directed to a deployable fairing structure attached to a vehicle. The fairing structure comprises a flexible fabric enclosure, a series of internal pivotally connected rigid structural members, and a linear actuator. Upon extension of the actuator, tension is developed on at least part of the fabric surface such that when the fairing structure is internally air pressurized the tensioned surface conforms to an aerodynamic arc, and when the actuator is retracted, tension is released from at least part of the fabric surface.

In an embodiment, each end of the actuator is attached to one of the internal pivotally connected rigid structural members.

In another aspect, a fairing for a transport vehicle comprises an enclosure formed from flexible sheeting and forming an outer surface, with the enclosure defining an internal volume and being adapted to be internally pressurized. When the enclosure is internally pressurized, the outer surface of the enclosure is structurally stiff and conforms to a predefined aerodynamic shape. A ram air intake is in fluid communication with the interior volume. During forward motion of the transport vehicle, the outer surface of the enclosure defines an airflow boundary layer having relatively slower airflow than freestream airflow spaced outwardly from the airflow boundary layer relative to the outer surface, whereby the airflow boundary layer is disposed between the outer surface and the freestream airflow. The ram air intake extends from the outer surface of the enclosure beyond the airflow boundary layer into the freestream airflow and has an inlet disposed within and facing the freestream airflow. The inlet communicates along an airflow passage with an outlet into the internal volume.

In an embodiment, a cross-sectional area of the outlet is substantially larger than a cross-sectional area of the inlet and a cross-sectional area of the airflow passage expands from the inlet toward the outlet.

In an embodiment, the airflow passage curves inwardly toward the outer surface from the inlet toward the outlet.

In one embodiment, the fairing may further comprise a structural frame comprising a plurality of rigid structural members, wherein the enclosure is supported by and coupled to the structural frame.

In a further aspect, the present disclosure is directed to deployable fairing structure attached to a vehicle. The fairing structure comprises a flexible fabric enclosure, a series of internal pivotally connected rigid structural members carrying the enclosure, and an actuator, whereby upon contraction of the actuator a folding portion of the fairing structure folds into a stowed position while the remainder of the fairing structure retains structural stiffness. One or more cables and pulleys connect the folding portion of the fairing structure to the actuator.

In a still further aspect, the present disclosure is directed to a deployable fairing structure attached to a vehicle. The fairing structure comprises a flexible fabric enclosure and a series of internal pivotally connected rigid structural members carrying the enclosure. Some of the rigid structural members are channel extrusions attached to an inside surface of the enclosure by rigid rods within the channel extrusions on an outside surface of the enclosure, such that a fabric surface of the enclosure is de-wrinkled by fixing the fabric under tension at opposing ends of the channel extrusion.

In an embodiment, a pair of the channel extrusions are oriented end-to-end, the fabric is fixedly anchored at extreme ends of the pair of channel extrusions and tension is developed on the fabric surface by separating the pair of extrusions at their meeting point by force of a bridging screw. In a particular embodiment, the fabric surface is fixedly anchored to the extreme ends of the pair of extrusions by means of a threaded screw crimped within the extrusion channels on an outside surface of the enclosure.

In any of the foregoing embodiments, a sensor element such as radar, sonar, camera, or the like may be housed within the fabric enclosure or mounted onto the fabric surface such that when the fairing structure is internally air pressurized, the fabric surface remains true of form and relatively free of vibration when the fairing structure is subjected to turbulent airflow.

An underride crash deterrent system may comprise a deployable fairing structure attached to a vehicle, with the deployable fairing structure comprising a flexible fabric enclosure wherein the fabric enclosure is translucent and a light source is housed within the fabric enclosure such that a surface of the fabric surface is uniformly illuminated.

BRIEF DESCRIPTION OF THE DRAWINGS

These and other features will become more apparent from the following description in which reference is made to the appended drawings wherein:

FIG. 1B is a perspective view of an outer side of the trailer skirt embodiment of FIG. 1A, with the lower aerodynamic section thereof extended, shown mounted on a transport truck assembly;

FIG. 2 is a perspective view of an interior side of the trailer skirt embodiment of FIG. 1A with the lower aerodynamic section thereof extended;

FIG. 2A is a detail view of a portion of FIG. 2;

FIG. 6 shows an inner side view of the inner side of the trailer skirt embodiment of FIG. 1A with the lower aerodynamic section thereof extended;

FIG. 8A is an aft-looking interior view of an upper part of the trailing portion of the trailer skirt embodiment of FIG. 1A;

FIG. 9G is a side cross sectional view showing the ram air intake of FIG. 9E on the trailer skirt embodiment of FIG. 1A;

DETAILED DESCRIPTION

The present disclosure will describe a deployable fairing, principles of which may be used to provide a lightweight yet wind and vibration resistant deployable aerodynamic structure that can be used as a boattail at the back of a truck or transport trailer, or as a tractor-trailer gap enclosure between the cab and the trailer, or a trailer skirt on the lower sides of the trailer.

Reference is first made to FIGS. 1A to 1D, which show a trailer skirt embodiment of a deployable fairing according to an aspect of the present disclosure. The trailer skirt, denoted generally by reference 100, is a substantially tubular structure with an upper outer surface, a lower outer surface, an inner surface, a bottom surface, a top surface and a back surface. The forward ends of the inner and outer surfaces taper to a front leading edge. The top surface does not taper and so an inner and outer upper wing surface joins the tapering inner and outer sides to the top surface.

Figure 1A:
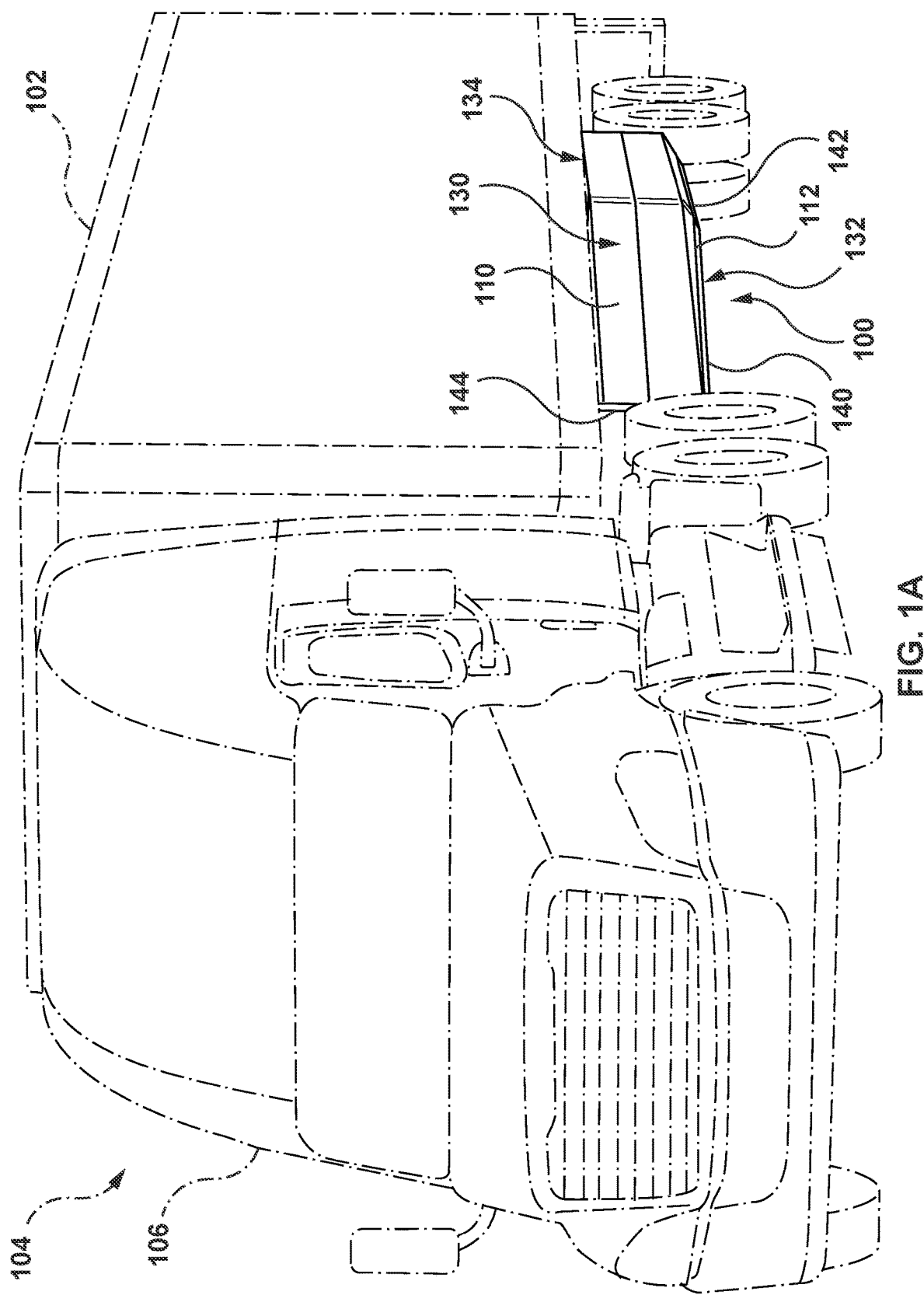
FIG. 1A is a perspective view of an outer side of trailer skirt embodiment of a deployable fairing according to an aspect of the present disclosure, with a lower aerodynamic section thereof retracted, shown mounted on a transport truck assembly.
Figure 1C:
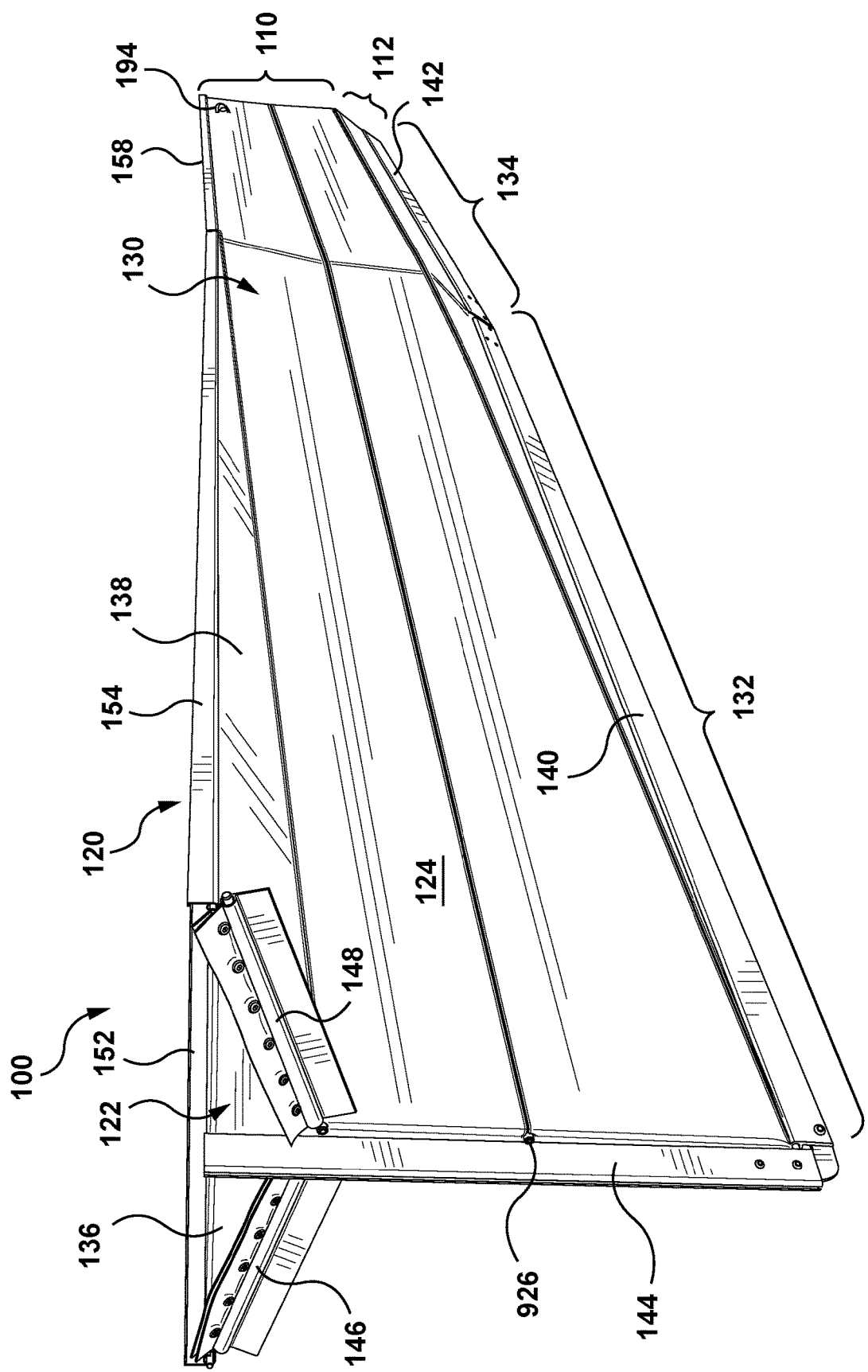
FIG. 1C is a perspective view of an outer side of the trailer skirt embodiment of FIG. 1A in isolation, with the lower aerodynamic section thereof retracted.
Figure 1D:
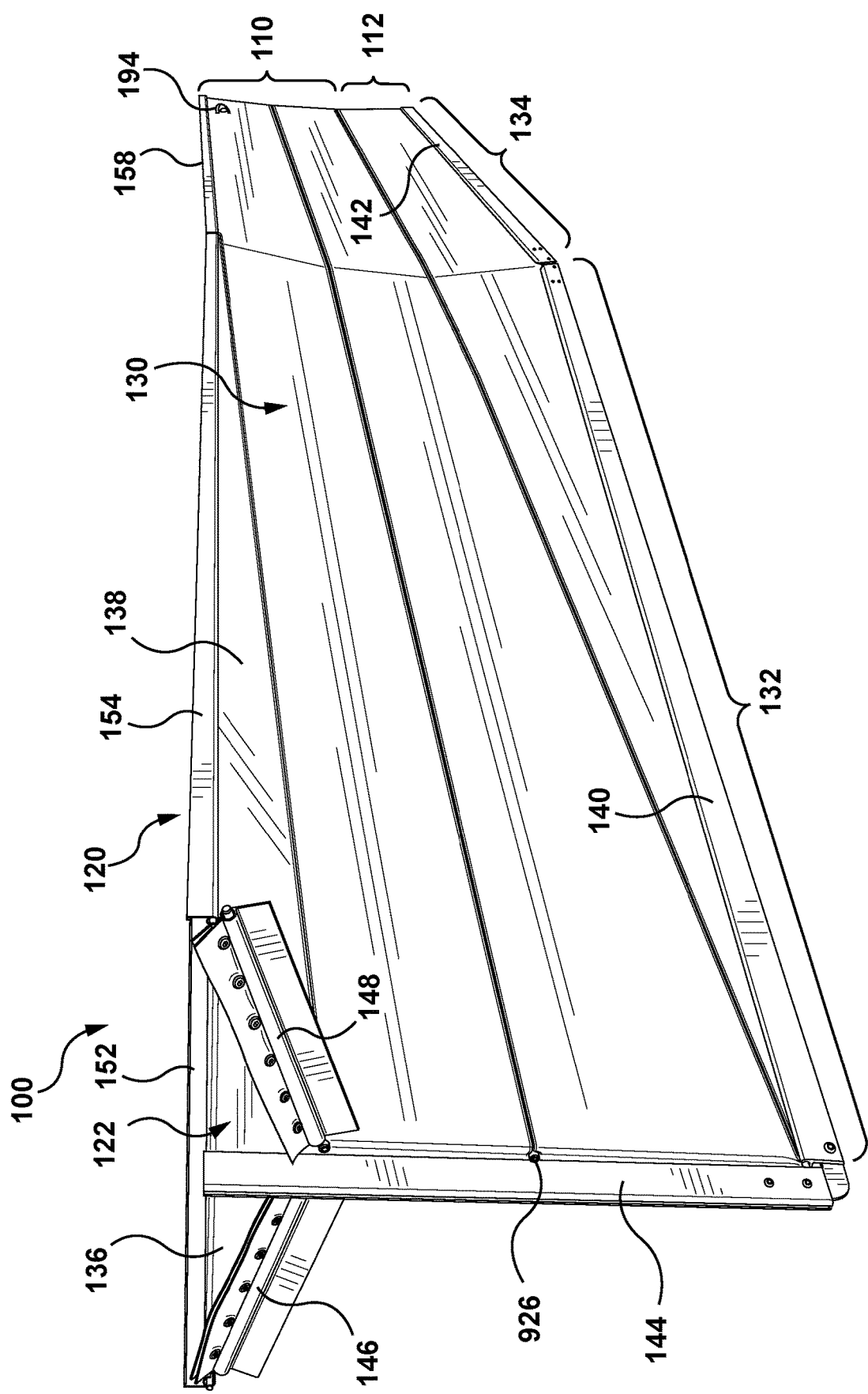
FIG. 1D is a perspective view of an outer side of the trailer skirt embodiment of FIG. 1A, with the lower aerodynamic section thereof extended.

In FIGS. 1A and 1B, the trailer skirt 100 is shown mounted on the underbody of a trailer 102 of a transport truck assembly 104 comprising the trailer 102 coupled to a cab 106. The transport truck assembly 104 is shown in dashed lines for context, and does not form part of the invention as claimed. The term "transport vehicle", as used herein, encompasses a complete transport truck assembly, or a trailer alone, or a straight truck. FIGS. 1C and 1D show the trailer skirt 100 in isolation.

The trailer skirt 100 comprises an upper safety guard section 110, which remains fixed in position, and a lower aerodynamic section 112, which, relative to the upper safety guard section 110, retracts and extends. During operation, the lower aerodynamic section 112 would be retracted at relatively slower speeds and extended at relatively higher speeds.

Figure 3:
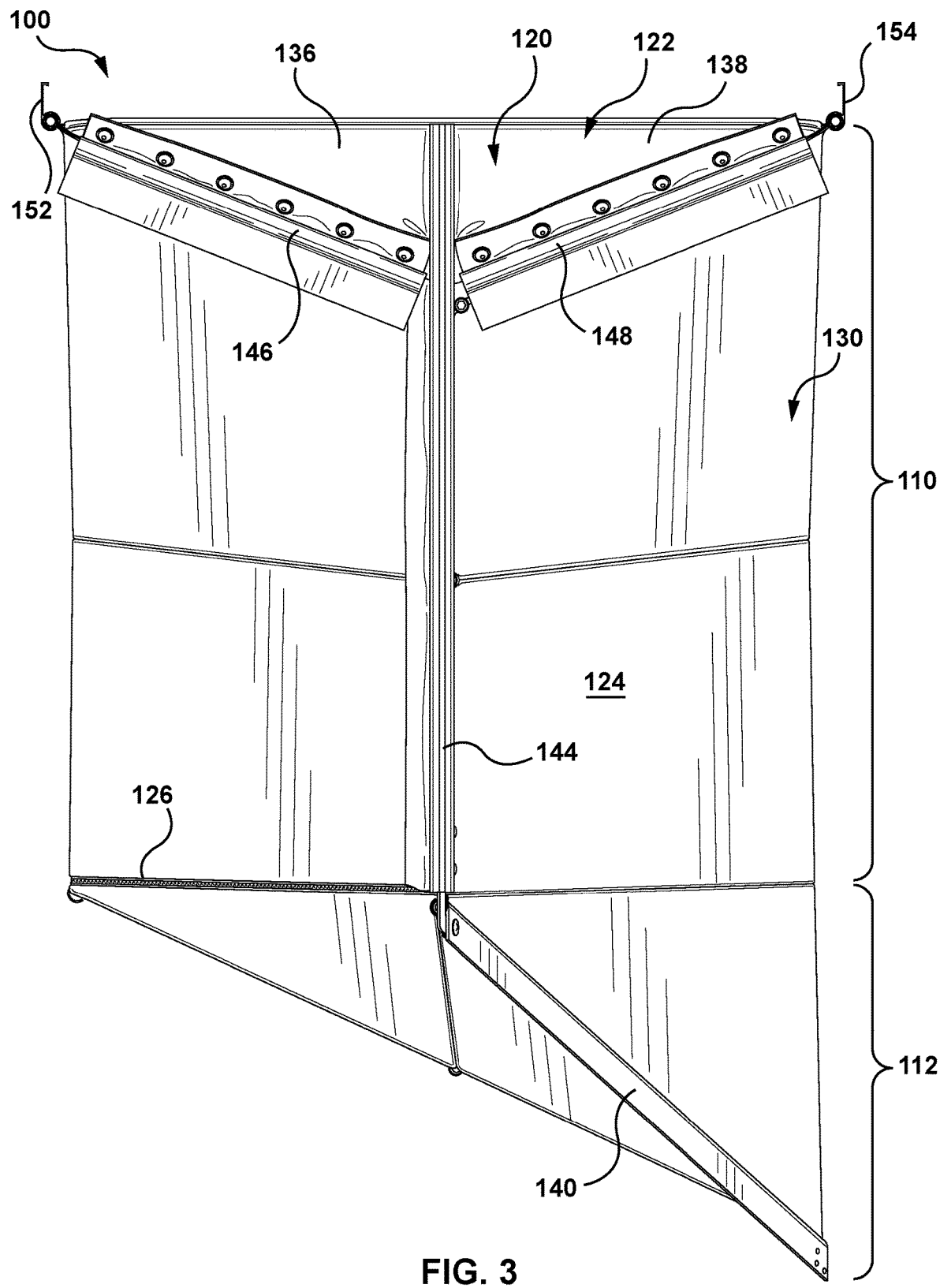
FIG. 3 shows a front view of the trailer skirt embodiment of FIG. 1A with the lower aerodynamic section thereof extended.
Figure 3A:
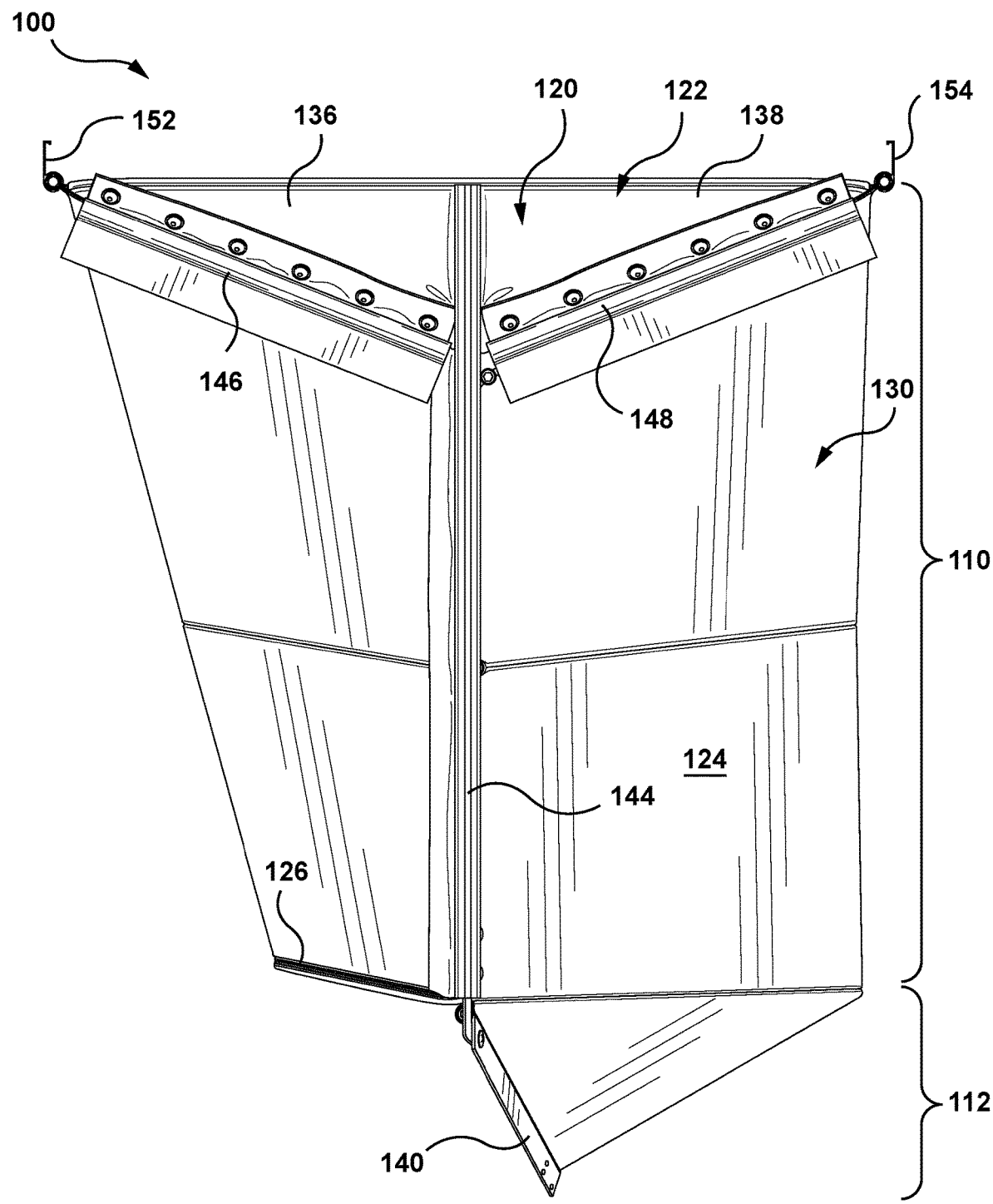
FIG. 3A shows a front view of the trailer skirt embodiment of FIG. 1A with the lower aerodynamic section thereof retracted.
Figure 4:
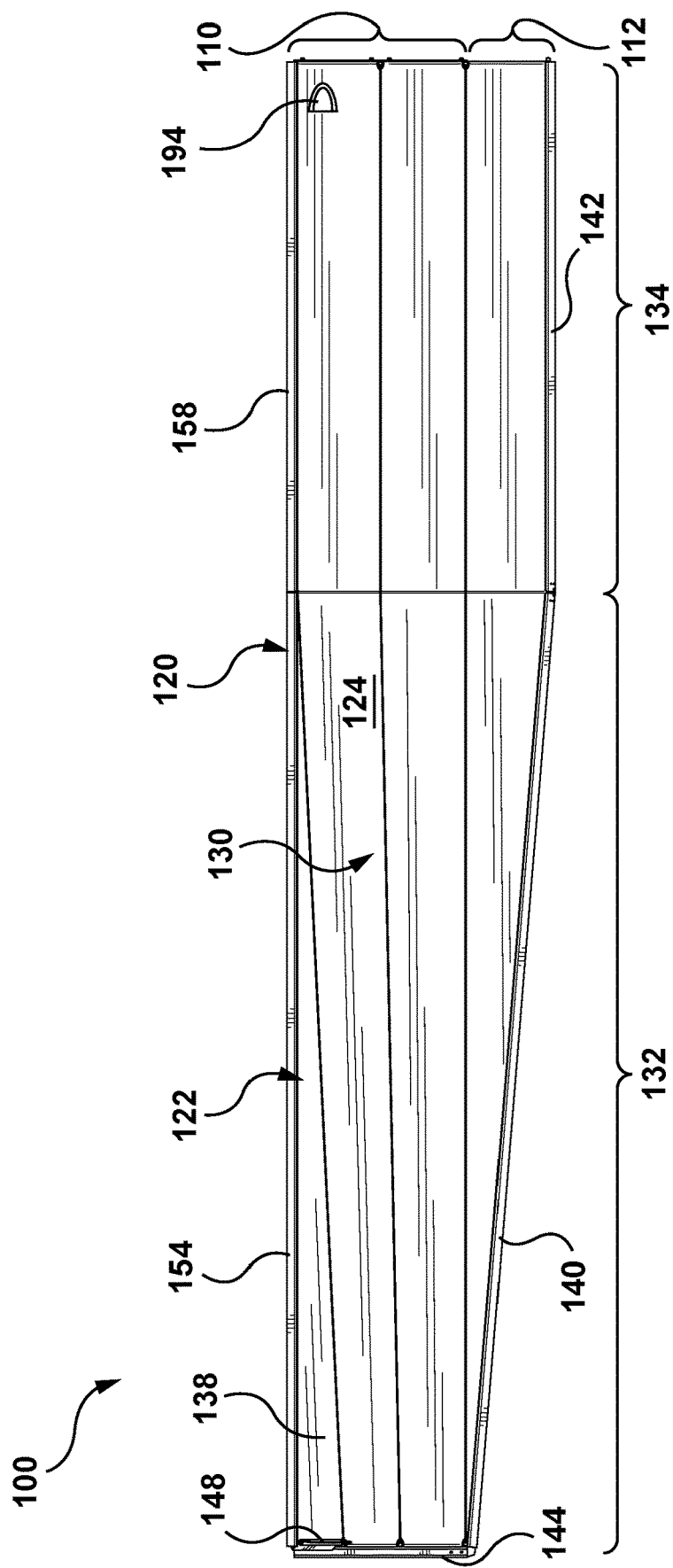
FIG. 4 shows an outer side view of the outer side of the trailer skirt embodiment of FIG. 1A with the lower aerodynamic section thereof extended.
Figure 5A:
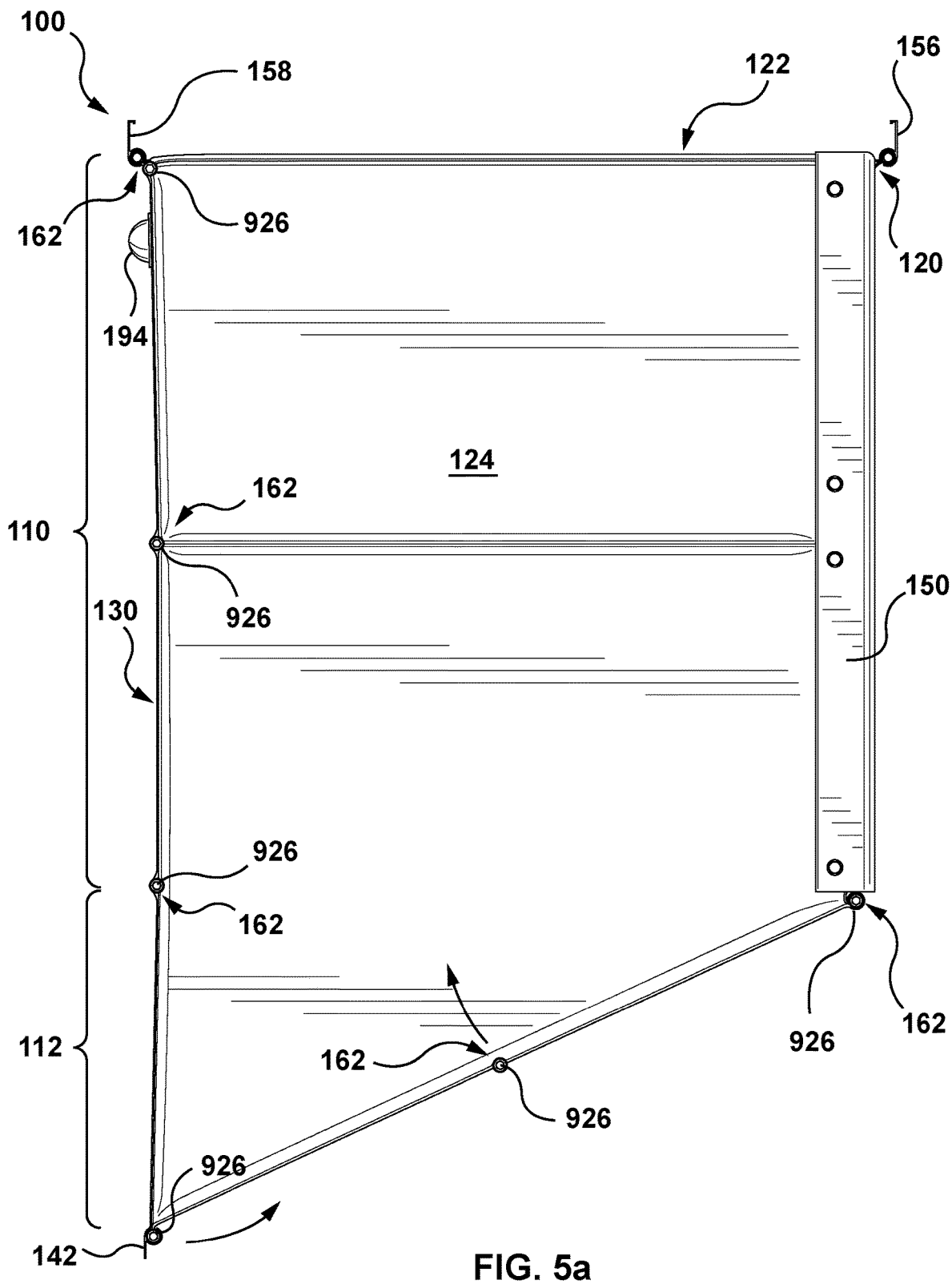
FIG. 5A shows a rear view of the trailer skirt embodiment of FIG. 1A with the lower aerodynamic section thereof extended.
Figure 5B:
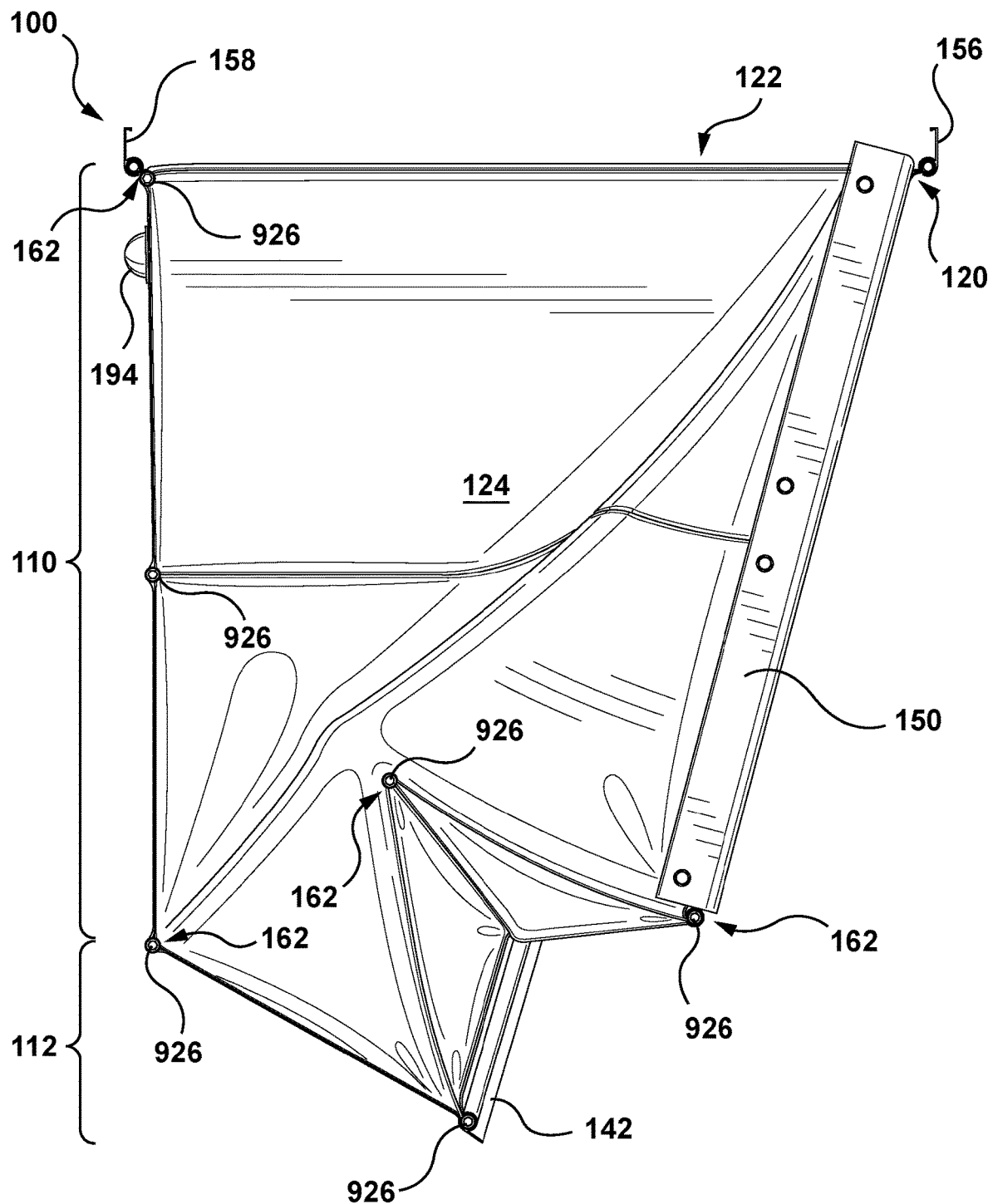
FIG. 5B shows a rear view of the trailer skirt embodiment of FIG. 1A with the lower aerodynamic section thereof retracted.

FIGS. 1A and 1C show an outer side of the trailer skirt 100 with the lower aerodynamic section 112 retracted and FIGS. 1B and 1D show an outer side of the trailer skirt 100 with the lower aerodynamic section 112 extended. FIG. 2 shows an interior side of the trailer skirt 100 with the lower aerodynamic section 112 extended. FIG. 3 shows a front view of the trailer skirt 100 with the lower aerodynamic section 112 extended and FIG. 3A shows a front view of the trailer skirt 100 with the lower aerodynamic section 112 retracted. FIG. 4 shows a side view of the outer side of the trailer skirt 100 with the lower aerodynamic section 112 extended. FIG. 5A shows a rear view of the trailer skirt 100 with the lower aerodynamic section 112 extended and FIG. 5B shows a rear view of the trailer skirt 100 with the lower aerodynamic section 112 retracted. FIG. 6 shows a side view of the inner side of the trailer skirt 100 with the lower aerodynamic section 112 extended.

The trailer skirt 100 comprises a structural frame 120 comprising a plurality of rigid structural members. An enclosure 122 formed from flexible sheeting 124 is supported by and coupled to the structural frame 120. The flexible sheeting 124 may be, for example, a fabric, a plastic sheet, or a coated fabric. In a preferred embodiment, the sheeting 124 is monolithic, and a zipper 126 provides access to the interior 128 of the trailer skirt 100. The enclosure 122 is adapted to be internally pressurized, and forms an outer surface 130 of the trailer skirt 100. The trailer skirt 100 comprises a leading portion 132 and a trailing portion 134. The leading portion 132 of the safety guard section 110 is generally wedge-shaped, and tapers toward the forward end (i.e. relative to a trailer on which it is mounted) whereas the trailing portion 134 of the safety guard section 110 is generally rectangular parallepipedic in shape. The leading portion 132 of the upper safety guard section 110 includes an inner wing portion 136 and an outer wing portion 138 toward the upper end of the safety guard section 110.

The rigid structural members include edge members and internal members. In the illustrated embodiment, the edge members comprise a forward lower edge member 140, an aft lower edge member 142, a leading edge member 144, an inner side wing member 146, an outer side wing member 148, an inner side trailing member 150, a forward inner upper edge member 152, a forward outer upper edge member 154, an aft inner upper edge member 156 and an aft outer upper edge member 158. The inner side wing member 146 and the outer side wing member 148 support the inner wing portion 136 and an outer wing portion 138, respectively. The forward lower edge member 140 and aft lower edge member 142 provide an impact barrier for the aerodynamic section 112.

Figure 7A:
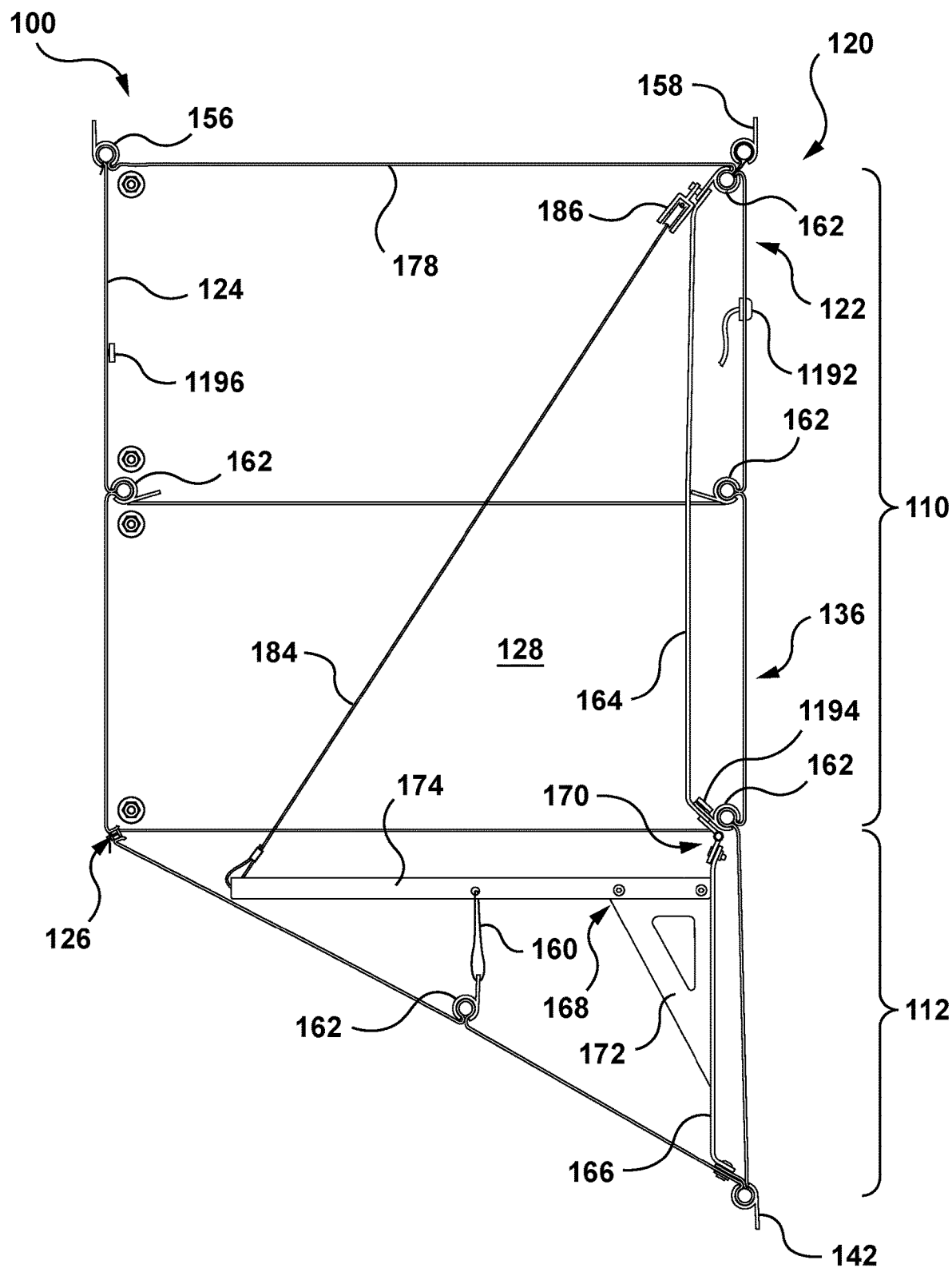
FIG. 7A shows a cross-sectional view of a trailing portion of the trailer skirt embodiment of FIG. 1A with the lower aerodynamic section thereof extended.
Figure 7B:
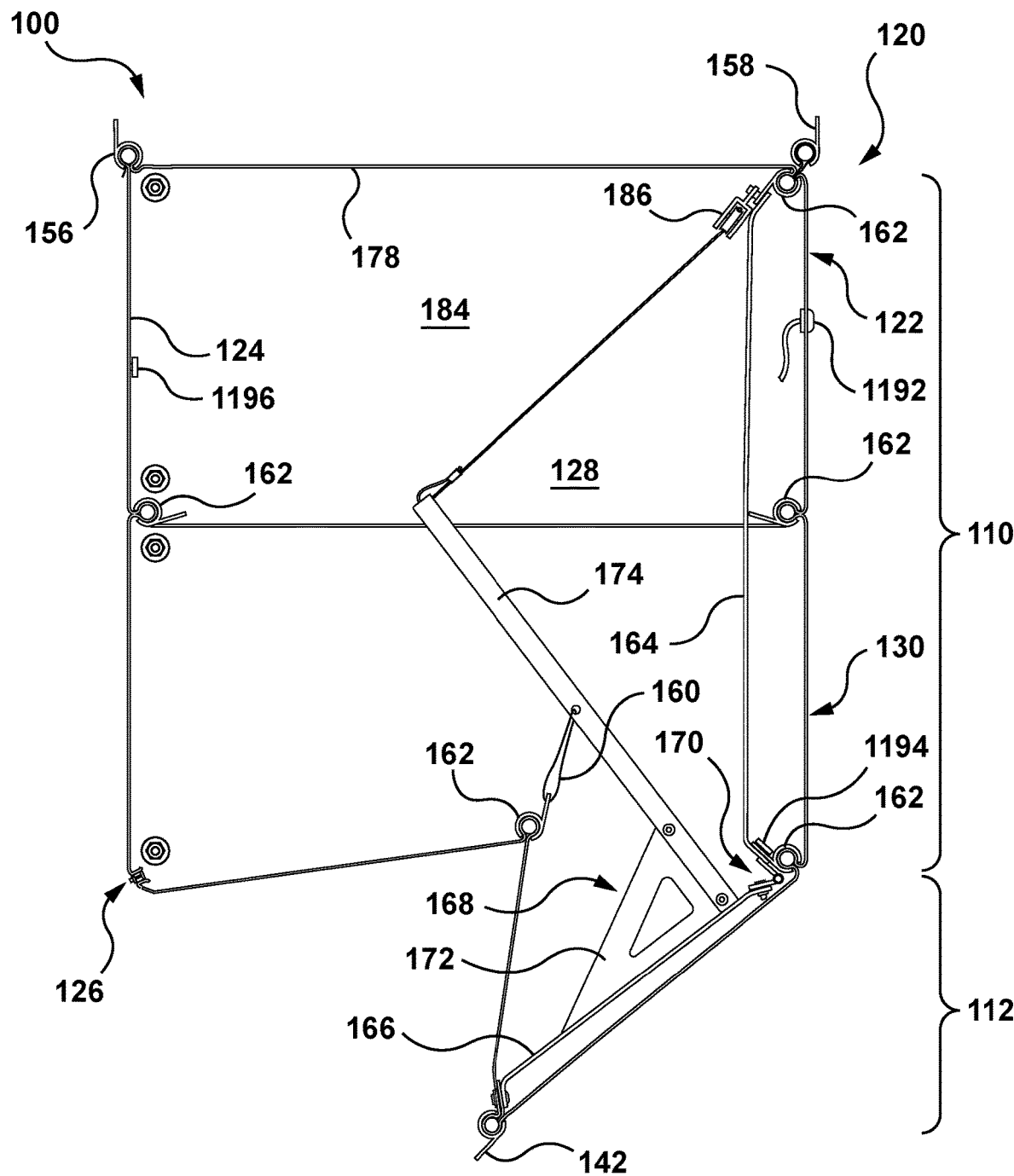
FIG. 7B shows a cross-sectional view of a trailing portion of the trailer skirt embodiment of FIG. 1A with the lower aerodynamic section thereof retracted.

As best seen in the cross-sectional view in FIGS. 7A and 7B, the internal members comprise a plurality of longitudinally extending ribs 162, a plurality of safety guard section bracing struts 164, a plurality of aerodynamic section bracing struts 166 and a plurality of L-brackets 168. The longitudinally extending ribs 162 are affixed to the interior of the enclosure 122 formed from the flexible sheeting 124, and may be formed as rod-in-channel extrusions as described further below. The safety guard section bracing struts 164 serve as vertical bridging members fixedly connecting the aft outer upper edge member 158 to the lowermost outer longitudinally extending rib 162. The aerodynamic section bracing struts 166 serve as vertical bridging members connecting the aft lower edge member 142 to the lowermost outer longitudinally extending rib 162. The aerodynamic section bracing struts 166 are fixed to the aft lower edge member 142, and are pivotally coupled to the lowermost outer longitudinally extending rib 162 with hinges 170 where folding occurs, either directly or by coupling to the safety guard section bracing struts 164. The L-brackets 168 are coupled to respective ones of the aerodynamic section bracing struts 166, and comprise an angle member 172 and an inwardly extending lever arm 174.

The structural frame 120 comprises at least two subframes. In the illustrated embodiment, the structural frame 120 comprises a rigid subframe adapted to be fixedly secured on the transport vehicle and a folding subframe that folds relative to the transport vehicle. More particularly, in the illustrated embodiment, the rigid subframe generally corresponds to the safety guard section 110 and the folding subframe generally corresponds to the aerodynamic section 112. Thus, in the illustrated embodiment the rigid subframe is formed by the leading edge member 144, the inner side wing member 146, the outer side wing member 148, the inner side trailing member 150, the forward inner upper edge member 152, the forward outer upper edge member 154, the aft inner upper edge member 156, the aft outer upper edge member 158, safety guard section bracing struts 164, together with the longitudinally extending ribs 162 associated with the safety guard section 110. Similarly, the folding subframe is formed by the forward lower edge member 140, the aft lower edge member 142, the aerodynamic section bracing struts 166 and the L-brackets 168, together with the longitudinally extending ribs 162 associated with the aerodynamic section 112.

The subframes are pivotally, for example hingedly, coupled to one another so that the structural frame 120 is foldably movable between a collapsed configuration, shown in FIGS. 1A, 1C, 3A, 5A, and 7A, and an expanded configuration, shown in FIGS. 1B, 1D, 2, 3, 4, 6, and 7B. As can be seen in the Figures, the enclosure 122 moves with the structural frame 120 and unfolds when the structural frame 120 moves from the collapsed configuration to the expanded configuration and the enclosure 122 folds in upon itself when the structural frame 120 moves from the expanded configuration to the collapsed configuration. When the structural frame 120 is in the collapsed configuration, the aerodynamic section 112 is retracted relative to the safety guard section 110, and when the structural frame 120 is in the expanded configuration, the aerodynamic section 112 is extended relative to the safety guard section 110.

Figure 8B:
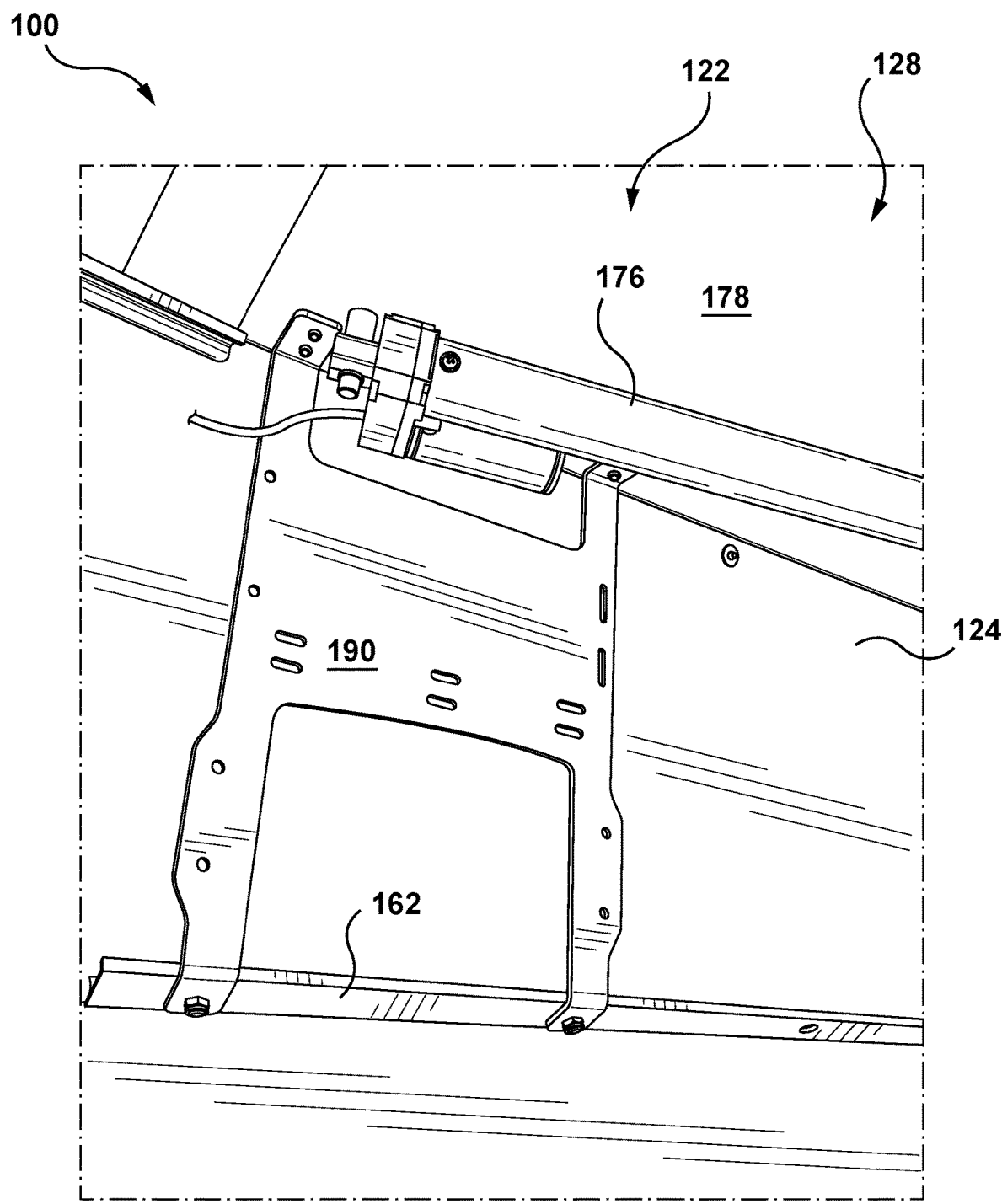
FIG. 8B is a detailed interior view of an upper part of the trailing portion of the trailer skirt embodiment of FIG. 1A showing an actuator thereof.

A linear actuator 176 acts between the rigid subframe and the folding subframe, and is adapted to move the structural frame 120 between the expanded configuration and the collapsed configuration. In the illustrated embodiment, as seen in FIGS. 8A and 8B, the linear actuator 176 is fixed along the inner top surface 178 of the enclosure 122, and is coupled by a cable and pulley system 180 to the L-brackets 168. As shown in FIG. 8A, the illustrated cable and pulley system 180 comprises cabling 184, which is run through pulleys 186 to the lever arms 174 of the L-brackets 168, which are coupled to respective ones of the aerodynamic section bracing struts 166. The linear actuator 176 is supported by a support cable 188 extending between the aft inner upper edge member 156 and the aft outer upper edge member 158. A reinforcement plate 190 extends between the aft inner upper edge member 156 and the nearest longitudinally extending rib 162 adjacent the linear actuator 176. At least in the trailing portion 134, the rigid structural members of the rigid subframe are internally anchored by inelastic cords 192. Seven radially looped cords 192 may be used to support the rigid structural members of a 20-foot long trailer skirt under pressure.

The linear actuator 176 may be configured to be responsive to a speed sensor, such as a speedometer, GPS-based speed sensor, or the like, for example. Thus, a trailer skirt 100 according to the present disclosure can combine the safety guard function with an aerodynamically optimum skirt, and use a speed sensitive retraction system where (for example) only the lower 12 to 14 inches of the trailer skirt 100 is retracted at slower speeds and the folding edge at (for example) the 18 inch clearance level is rigidly fixed to provide a safety barrier for pedestrians and cyclists, and to allow service access under the skirt. The present disclosure provides a practical approach to automatic speed-based deployment by efficiently configuring a single actuator to move a large three-dimensional aerodynamic structure between retracted and deployed states without compromising weight, surface form, or wind resistance/stability, while protecting the actuator and moving parts from the outside environment.

As can be seen in FIGS. 7A and 7B, since the aerodynamic section bracing struts 166 are pivotally coupled to the lowermost outer longitudinally extending rib 162, when the linear actuator 176 is retracted, the cabling 184 is retracted to pivot the L-brackets 168 upwardly, and the aft lower edge member 142 moves upwardly and inwardly, toward the zipper 126. This causes the outer surface of the aerodynamic section 112 to fold upwardly and the inner surface of the aerodynamic section 112 folds inwardly upon itself. The longitudinally extending rib 162 disposed between the zipper 126 and the aft lower edge member 142 is coupled by a short loop of cable 160 to the inwardly extending lever arm 174 of the L-bracket 168 to facilitate folding. Conversely, when the linear actuator 176 is extended, the L-brackets 168 pivot downwardly under their own weight, allowing the outer surface of the aerodynamic section 112 to unfold downwardly and allowing the inner surface of the aerodynamic section 112 to unfold as well. Equivalently, a motor may be used as an actuator, rather than a linear actuator, for example winding and unwinding the cabling 184 from a coil.

Figure 9A:
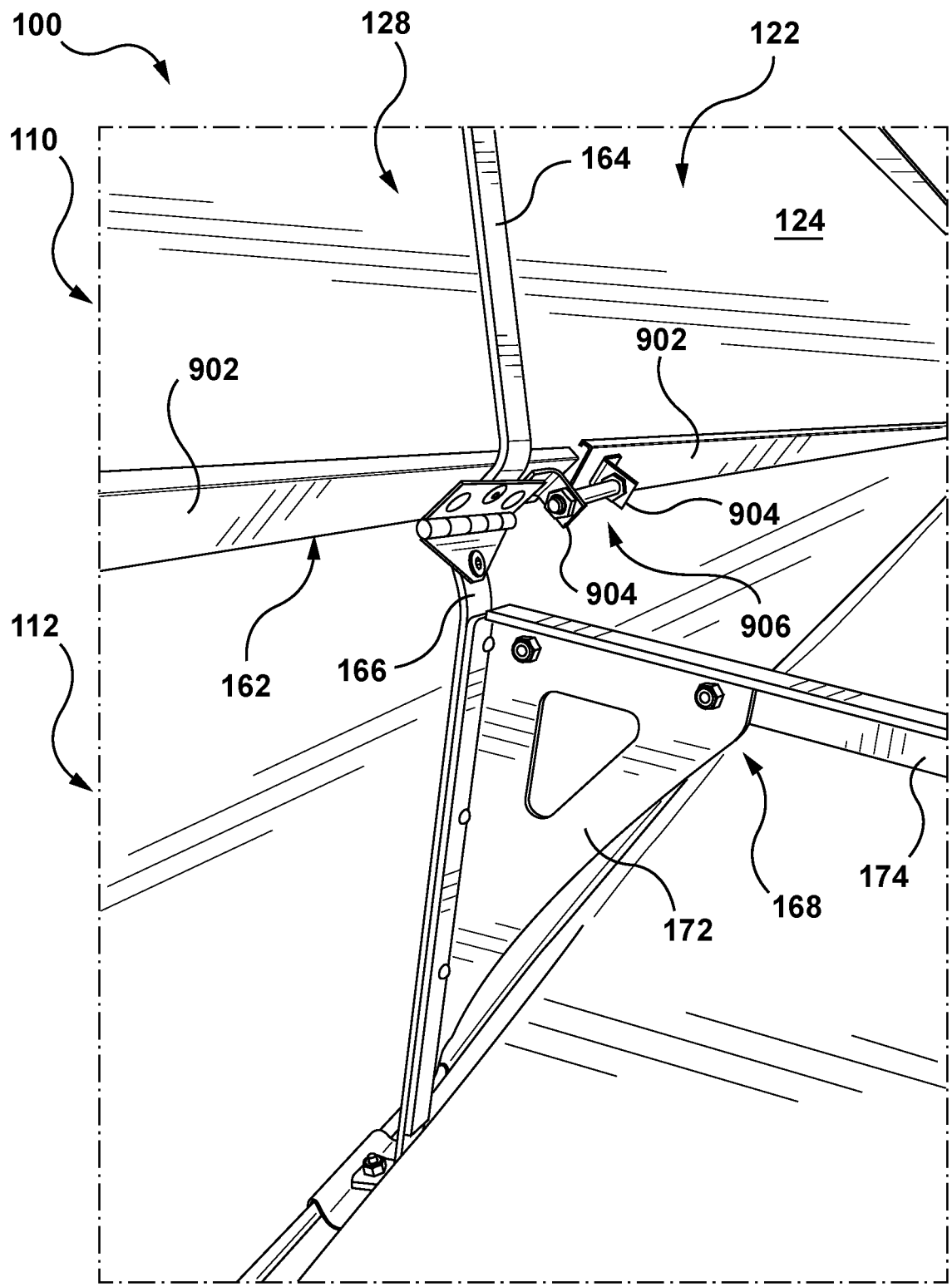
FIG. 9A is a forward-looking detailed interior view of a lower part of the trailing portion of the trailer skirt embodiment of FIG. 1A.
Figure 9B:
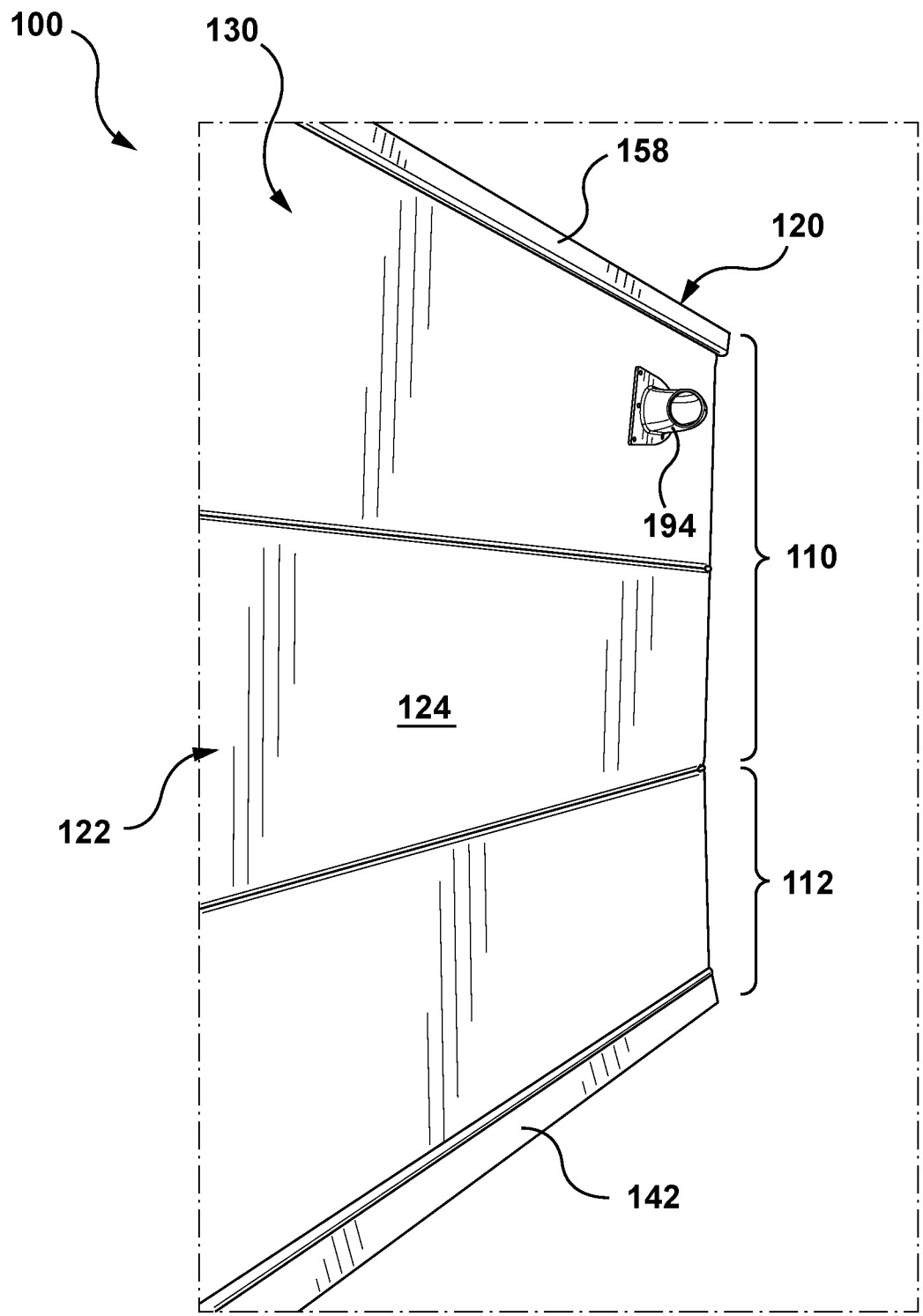
FIG. 9B is an aft-looking exterior view of the trailing portion of the trailer skirt embodiment of FIG. 1A showing a ram air intake thereof.

Extension of the linear actuator 176 drives movement of the structural frame 120 from the collapsed configuration to the expanded configuration and develops tension on the portion of the outer surface of the enclosure 122 associated with the aerodynamic section 112. When the enclosure 122 is internally pressurized while the structural frame 120 is in the expanded configuration (i.e. the aerodynamic section 112 is extended), the entire outer surface of the enclosure 122 is structurally stiff and conforms to a predefined aerodynamic shape. Movement of the structural frame 120 from the expanded configuration to the collapsed configuration releases the tension. Preferably, when the enclosure 122 is internally pressurized while the structural frame 120 is in the collapsed configuration, the portion of the outer surface of the enclosure 122 surrounding the rigid subframe is structurally stiff and maintains conformity with its corresponding portion of the predefined aerodynamic shape. Thus, when the enclosure 122 is internally pressurized while the structural frame 120 is in the collapsed configuration (i.e. the aerodynamic section 112 is retracted), at least the safety guard section 110 remains structurally stiff in conformity with its predefined aerodynamic shape. Pressurization of the enclosure 122 may be achieved using any suitable method, for example by way of ram air. FIG. 9B shows a ram air intake 194 disposed toward the upper aft end of the trailer skirt 100.

Figure 9C:
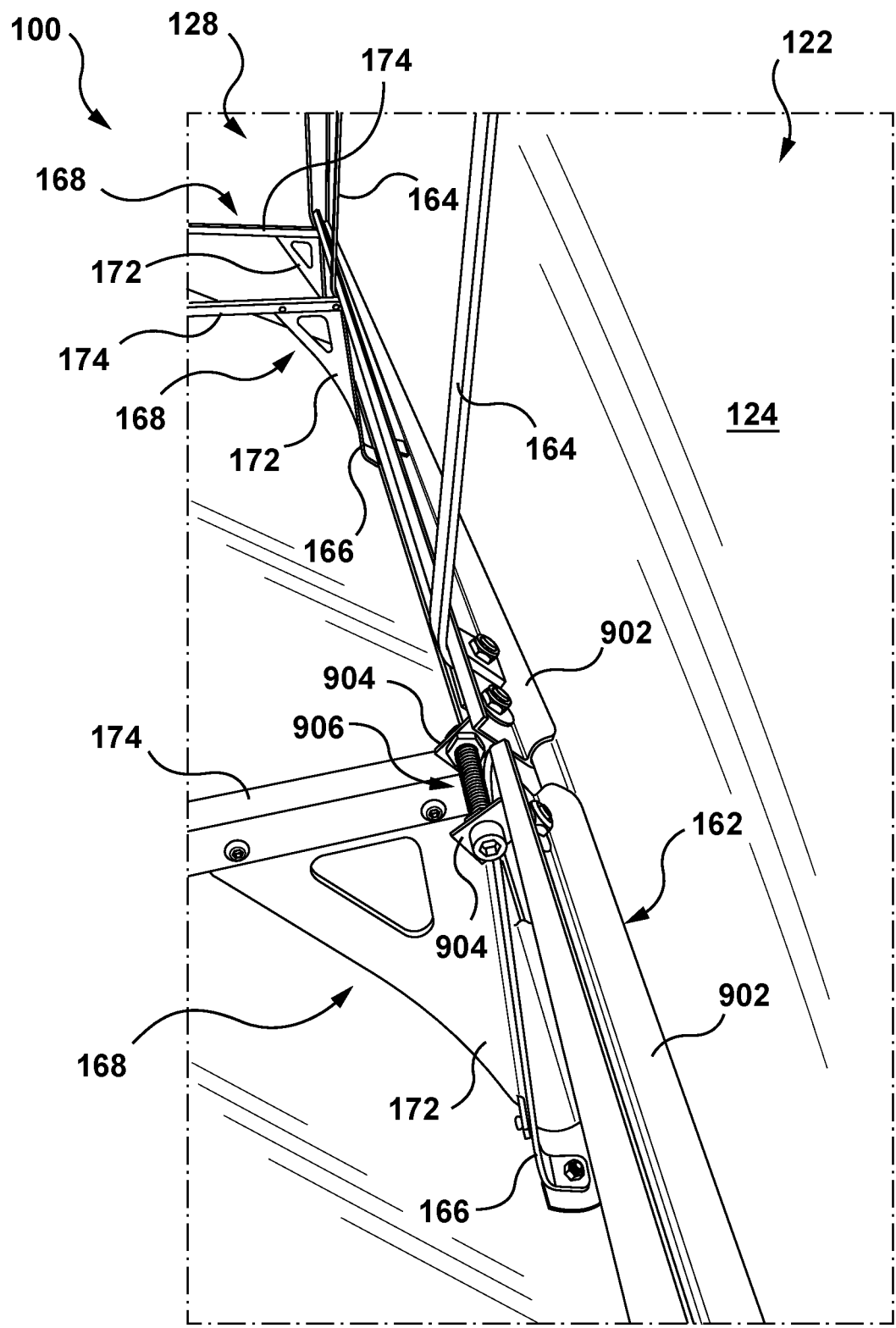
FIG. 9C is an aft-looking detailed interior view of the lower part of the trailing portion of the trailer skirt embodiment of FIG. 1A.
Figure 9D:
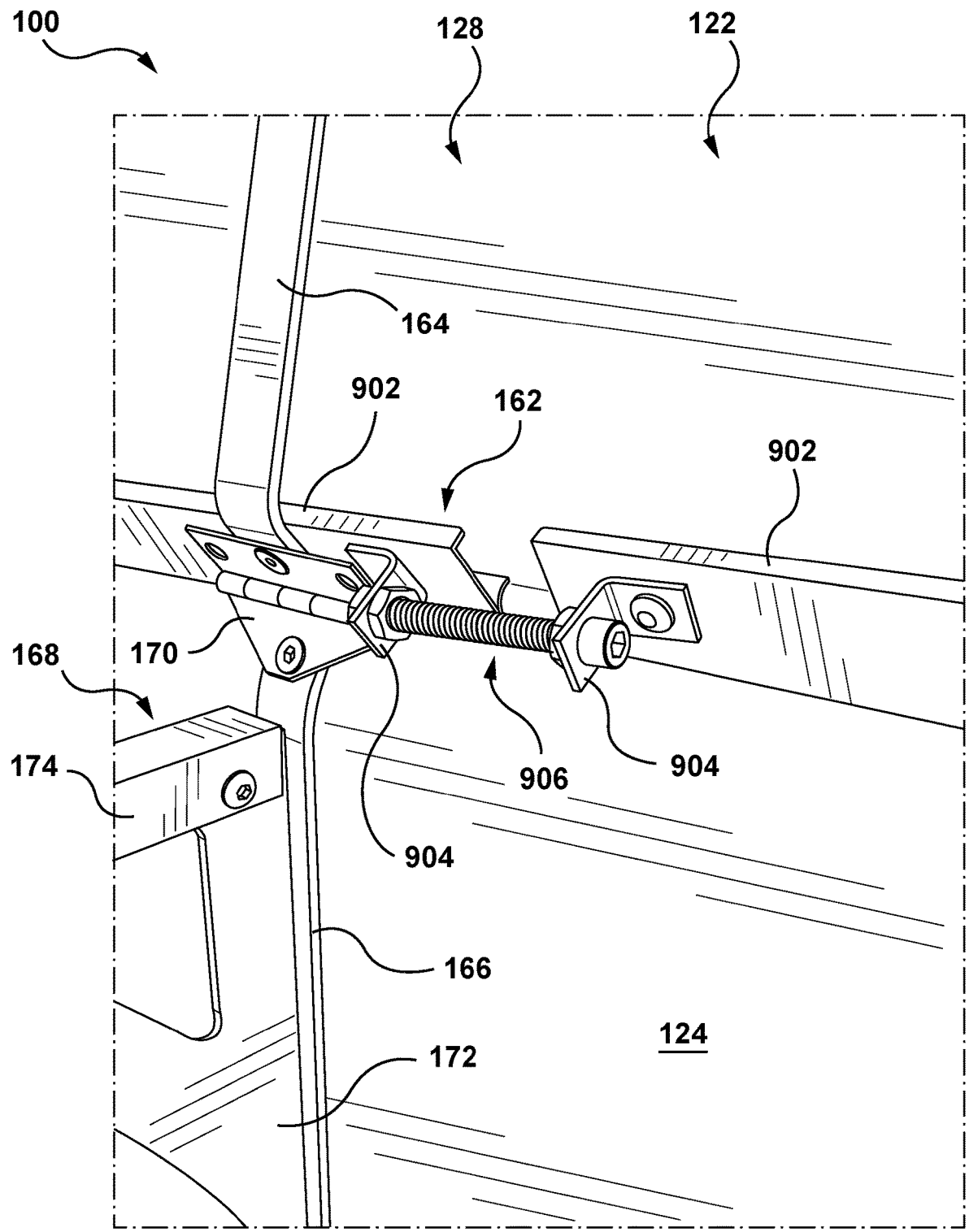
FIG. 9D is a detailed interior view the trailer skirt embodiment of FIG. 1A showing a tensioning arrangement.
Figure 9E:
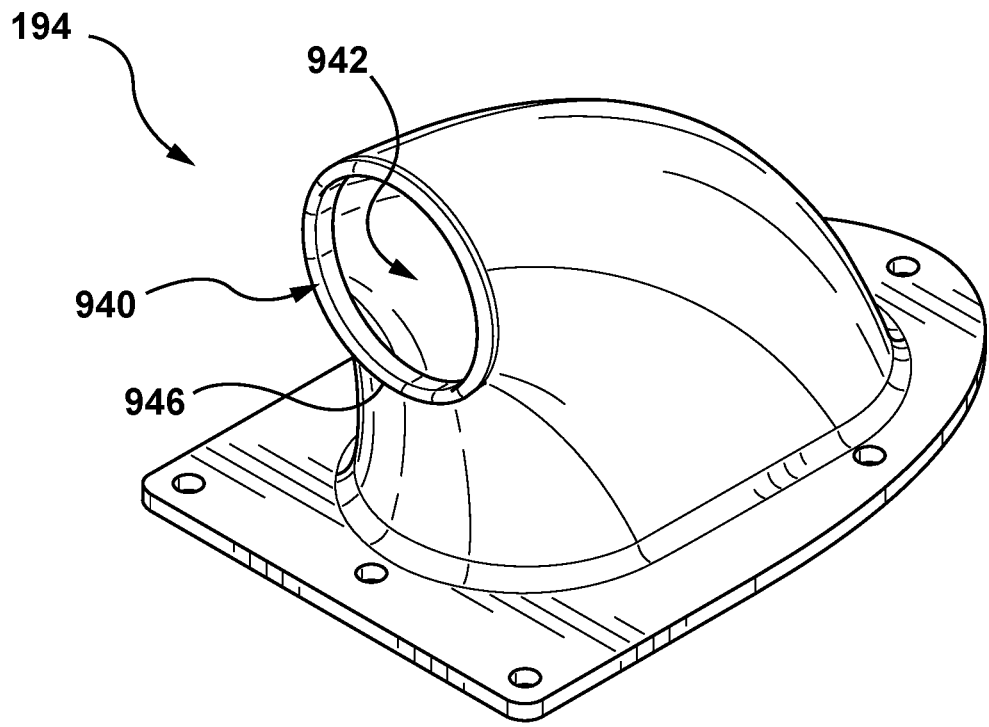
FIG. 9E is a first perspective view of an illustrative ram air intake.
Figure 9F:
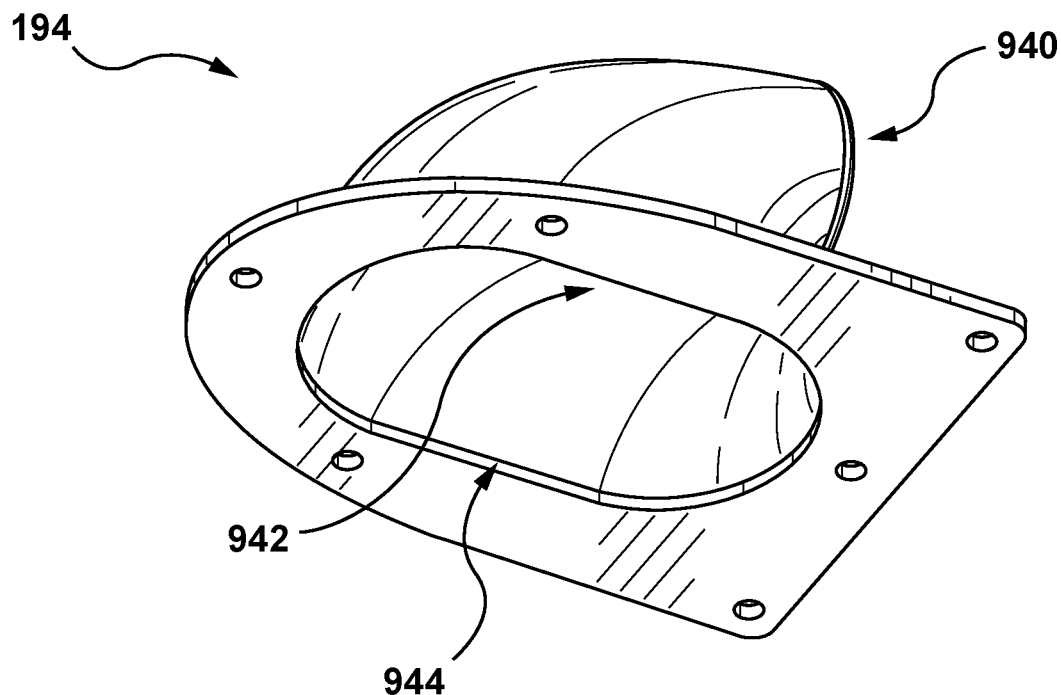
FIG. 9F is a second perspective view of the ram air intake of FIG. 9E.

Reference is now made to FIGS. 9E to 9G, which show an illustrative embodiment of ram air intake 194 in more detail. The illustrative ram air intake 194 is in fluid communication with the interior volume 930 of the enclosure 122 formed by the sheeting 124. As best seen in FIG. 9G, during forward motion of the transport vehicle (e.g. transport truck assembly 104), the outer surface 932 of the enclosure 122 defines an airflow boundary layer 934 having relatively slower airflow 936 than a freestream airflow 938 spaced outwardly from the airflow boundary layer 934 relative to the outer surface. As can be seen, the airflow boundary layer 934 is disposed between the outer surface 932 and the freestream airflow 938.

The ram air intake 194 extends from the outer surface 932 beyond the airflow boundary layer 934 into the freestream airflow 938 and has an inlet 940 disposed within and facing the freestream airflow 938. In one preferred embodiment, the innermost edge 946 of the inlet 940 (that is, the edge 946 closes to the outer surface 932) is at least 1 inch (0.254 cm), more preferably 1.5 inches (0.381 cm) and more preferably at least 2 inches (0.508 cm) from the outer surface 932. The inlet 940 communicates along an airflow passage 942 with an outlet 944 into the internal volume 930. As can be seen in FIG. 9G, the cross-sectional area of the outlet 944 is substantially larger than the cross-sectional area of the inlet 940. Thus, the cross-sectional area of the airflow passage 942 expands from the inlet 940 toward the outlet 944, which can inhibit blockage of the airflow passage 942. Preferably, the cross-sectional area of the airflow passage 942 continuously expands from the inlet 940 toward the outlet 944. Also preferably, the airflow passage curves inwardly toward the outer surface from the inlet toward the outlet. In one preferred embodiment, the cross-sectional area of the inlet 940 is between 1 square inch (6.45 cm$^2$) and 2 square inches (12.9 cm$^2$) and the cross-sectional area of the outlet 944 is between 3 square inches (19.35 cm$^2$) and 6 square inches (38.71 cm$^2$) although these values are not intended to be limiting. While the ram air intake 194 is shown in the context of the trailer skirt embodiment 100, it may be adapted to the boattail embodiment 1100 described below, or to any other suitable internally pressurized fairing. The ram air intake 194 may be affixed to the sheeting 124 by fasteners 948 such as rivets, or by other suitable fastening technique.

Figure 10A:
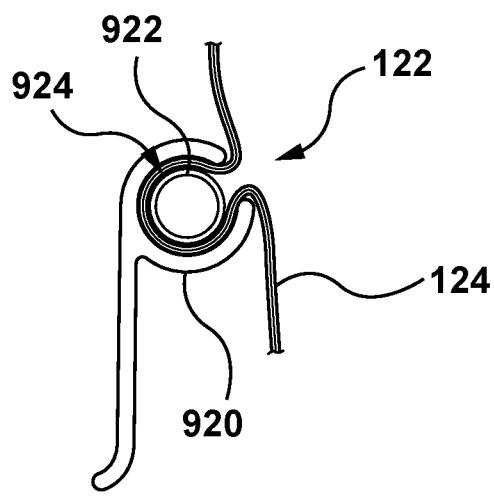
FIG. 10A shows a rod-in-channel construction for rigid structural members of the trailer skirt embodiment of FIG. 1A.

At least some of the rigid structural members may be formed by way of a rod-in-channel arrangement, as shown in FIG. 10A. In such embodiments, the rigid structural members comprise channel extrusions 920 attached to the inside surface of the sheeting 124 that forms the enclosure 122 by rigid rods 922 disposed within the channels 924 in the channel extrusions 920, on the outside surface of the sheeting 124. Thus, the sheeting 124 is trapped in the channels 924 by the rods 922.

In preferred embodiments, tensioning elements, and preferably adjustable tensioning elements, are interposed between adjacent rigid structural members for tensioning the enclosure. For example, as shown in FIGS. 9A, 9C and 9D, the longitudinally extending ribs 162 may be formed in segments 902 oriented end-to-end and joined by brackets 904 and nut-and-bolt assemblies 906 that apply tension between adjacent segments 902. Similarly, forward and aft edge members may be joined to one another by a tensioning element. For example, as shown in FIG. 2A, the forward lower edge member 140 and the aft lower edge member 142 are joined end-to-end by way of brackets 908 and a bolt 910 threadedly received in a sleeved spring 912 interposed between the forward lower edge member 140 and the aft lower edge member 142 in order to maintain tensioning through the retraction-extension cycle while accommodating the geometric change to the aerodynamic section 112 that occurs with retraction. A guide bolt 914 is also received in the brackets 908 to maintain alignment between the forward lower edge member 140 and the aft lower edge member 142.

Figure 10B:
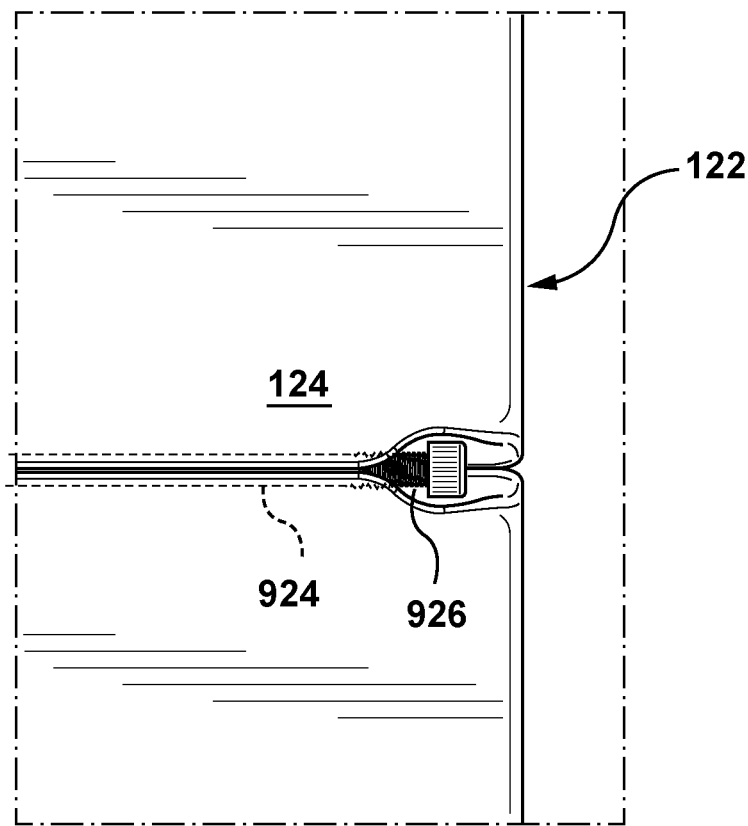
FIG. 10B shows anchoring of sheeting at ends of the trailer skirt embodiment of FIG. 1A.

The surface of the sheeting 124 can be de-wrinkled by fixing the sheeting 124 under tension at opposing ends of a series of channel extrusions 920. As shown in FIG. 10B, the sheeting 124 can be fixedly anchored at the extreme ends of a series of end-to-end channel extrusions 920, for example by a threaded screw 926 crimped within the channels 924 on an outside surface of the enclosure 122 formed by the sheeting 124. Tension can then be developed on the surface of the sheeting 124 by separating the channel extrusions 920 at their meeting point(s), for example by way of nut-and-bolt assemblies 906, sleeved spring 912, or other suitable arrangement.

The negative effects of automotive radar cover vibration on radar signal quality have recently been examined (Bosch, R., "Vibrations in Automotive Radar Systems", 2016 IEEE NTT-S International Conference on Microwaves for Intelligent Mobility). Typically, the radar cover would be a car bumper; however, if a conventional composite panel trailer skirt were to be used as a radar cover, such composite panel skirts would be subject to the same adverse effects due to crosswind vibration and flutter. While a fabric-covered structure is inherently lightweight, it suffers from a weakness in that fabric tends to wrinkle when fixed to a stiff framing element, or even puckers when sewn. The wrinkles remain even when a closed fabric structure is air pressurized. Such wrinkling of an enclosure would adversely affect the performance of radar or a similar sensing device disposed therein.

However, the above-described tensioning arrangement may provide a highly stable and consistently smooth and true screen surface, especially when coupled with other stabilizing aspects described previously such as ram air pressure in conjunction with force balancing cables (see U.S. Pat. Nos. 8,087,715 and 8,336,950, the teachings of which are hereby incorporated by reference). The present disclosure provides an enclosed housing that is particularly well suited for sensor elements (e.g. safety sensors) and safety lighting.

With the tensioning arrangement described herein, the enclosure 122 is supported by and coupled to the structural frame 120, and when the enclosure 122 is internally pressurized, the outer surface of the enclosure 122 is structurally stiff and conforms to a predefined aerodynamic shape and is substantially free of airflow-induced vibration when the trailer skirt 100 is subjected to turbulent airflow. Accordingly, a sensor element, such as a thermal sensor, radar device, sonar device, LIDAR device or camera (these are merely illustrative non-limiting examples of sensors) may be disposed within the enclosure 122 or mounted onto the sheeting 124, and the sheeting 124 will remain substantially true of form and relatively free of vibration when the trailer skirt 100 is subjected to turbulent airflow, providing a suitable cover/housing/support for a sensor element. Additionally, the outer surface of the enclosure 122 will be relatively flexible at lower speeds, which may provide impact resistance for such a sensor element. In particular, the impact of an object striking a sensor element at lower speeds may be absorbed by flexion of the outer surface of the enclosure 122. Such sensor elements may be coupled, for example, to an onboard computer system or other data processing system and used to collect image data, weather data and road conditions data (these are merely illustrative non-limiting examples of data). The data may be used, for example and without limitation, in support of autonomous driving systems, safety systems, driver support systems, or for forensic analysis if a collision or similar incident is being investigated. FIGS. 7A and 7B show illustrative positioning of an illustrative sensor element 1192 in the form of a wide-angle camera carried by the sheeting 124; other mounting positions and configurations are also possible.

Another objective of the present disclosure is to provide conspicuous underride deterrent lighting that is not distracting. In some embodiments, the sheeting 124 may be translucent, and one or more light sources may be disposed within the enclosure 122 for substantially uniformly illuminating the outer surface 130 of the enclosure 122. For example, a string of LED lights may be positioned in the enclosure 122, substantially spaced from the sheeting 124 so as to create a large uniform frosted bulb effect. Optionally, for daytime underride avoidance, another string of LED lights may be strategically positioned within the enclosure 122, immediately adjacent the sheeting 124, so that the sheeting 124 provides a protective housing while allowing the LED lights to be visible in daylight. Where a sensor element (e.g. an anti-crash radar system) is disposed within the enclosure 122, it may interact with the LED lights and/or a speaker to provide visual and/or audible alerts when an object is approaching. FIGS. 7A and 7B show illustrative positioning of an illustrative LED light strip 1194 and LED backlight 1196 carried by the sheeting 124; other mounting positions and configurations are also possible. LEDs are merely one illustrative light source and other light sources are also contemplated.

As will be appreciated from the above description, fairings according to the present disclosure may be portable with self-contained structural elements, such that intimate or permanent connections between the fairing and the trailer are not required. Trailer skirts according to the present disclosure allow for relatively easy repositioning to keep the trailer skirt close to the desired wheel bogie setting, with an adjustable length front extension to keep the trailer skirt extended and anchored to the trailer landing gear for full length coverage, which is desirable from both an aerodynamic and safety standpoint. The front extension may, for example, take the form of an adjustable length of sheeting (e.g. wound onto a spring loaded roll) extending between the leading edge member 144 and the trailer landing gear.

Figure 11:
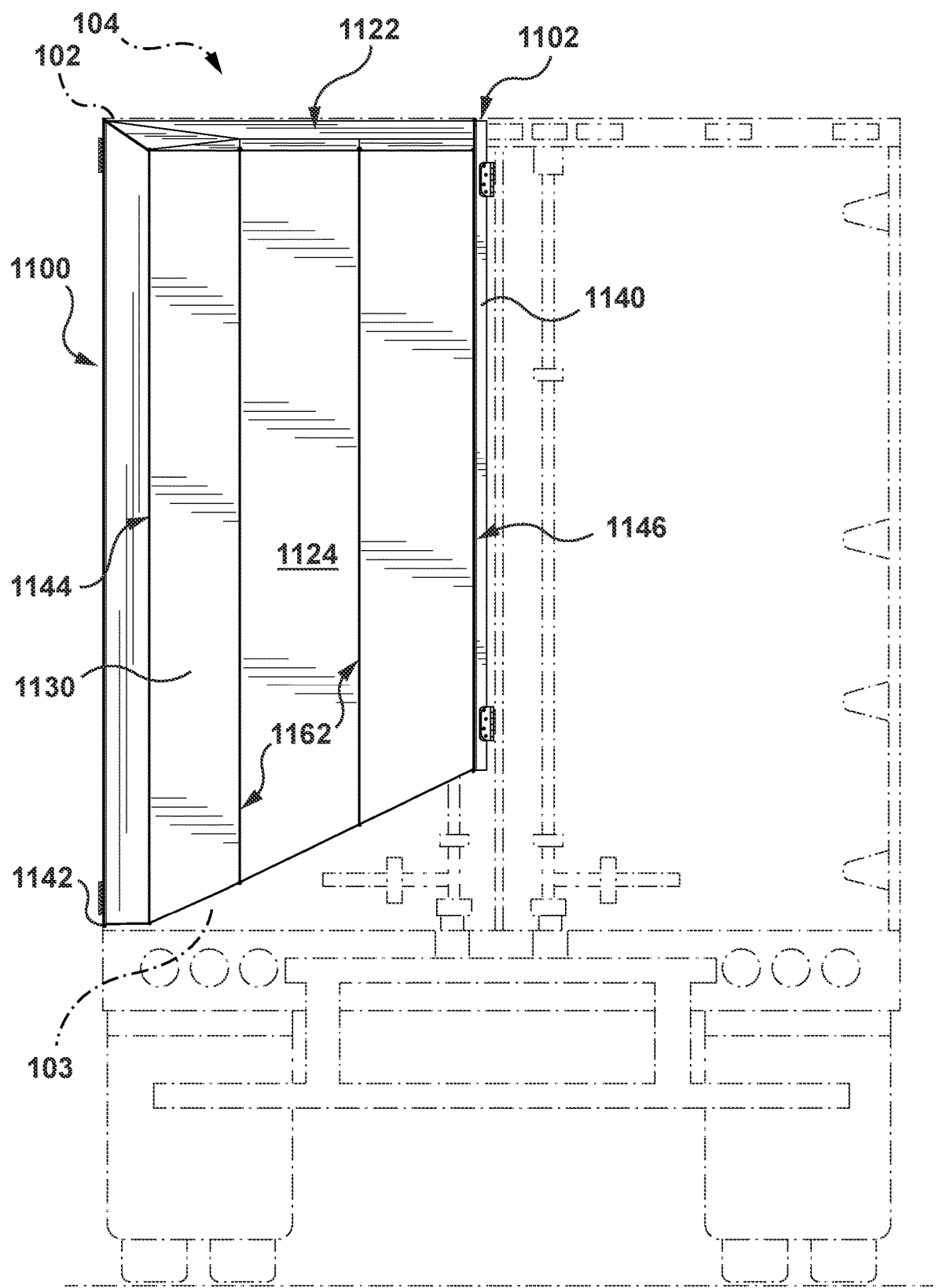
FIG. 11 is a rear view of a trailer of a transport truck assembly with a boattail embodiment of a deployable fairing according to another aspect of the present disclosure affixed to the left rear door of the trailer in an extended configuration.
Figure 12:
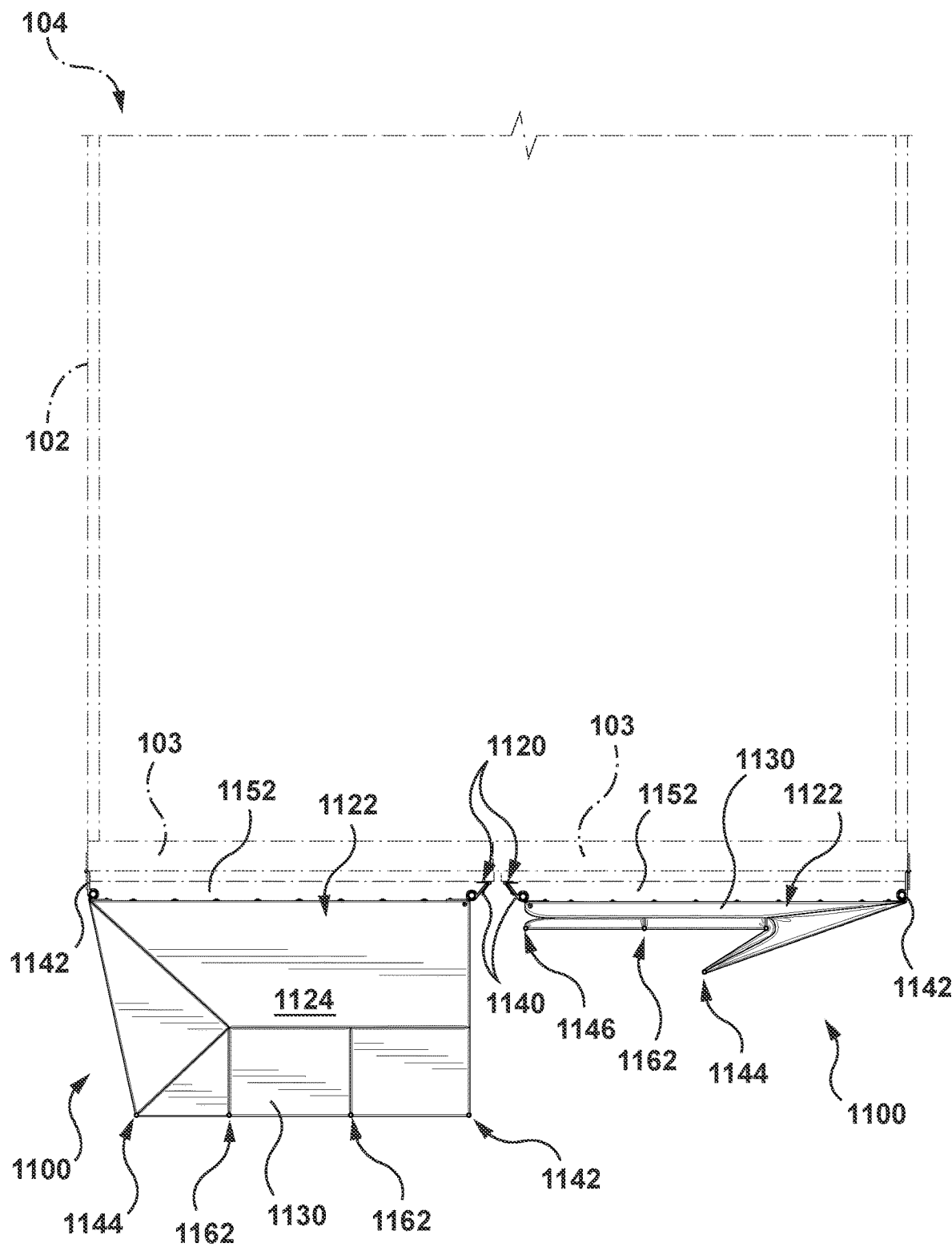
FIG. 12 is a top plan view of an aft portion of the trailer with one instance of the boattail embodiment affixed to each rear door, with the boattail embodiment affixed to the left rear door shown in the extended configuration and the boattail embodiment affixed to the right rear door shown in the retracted configuration.
Figure 13:
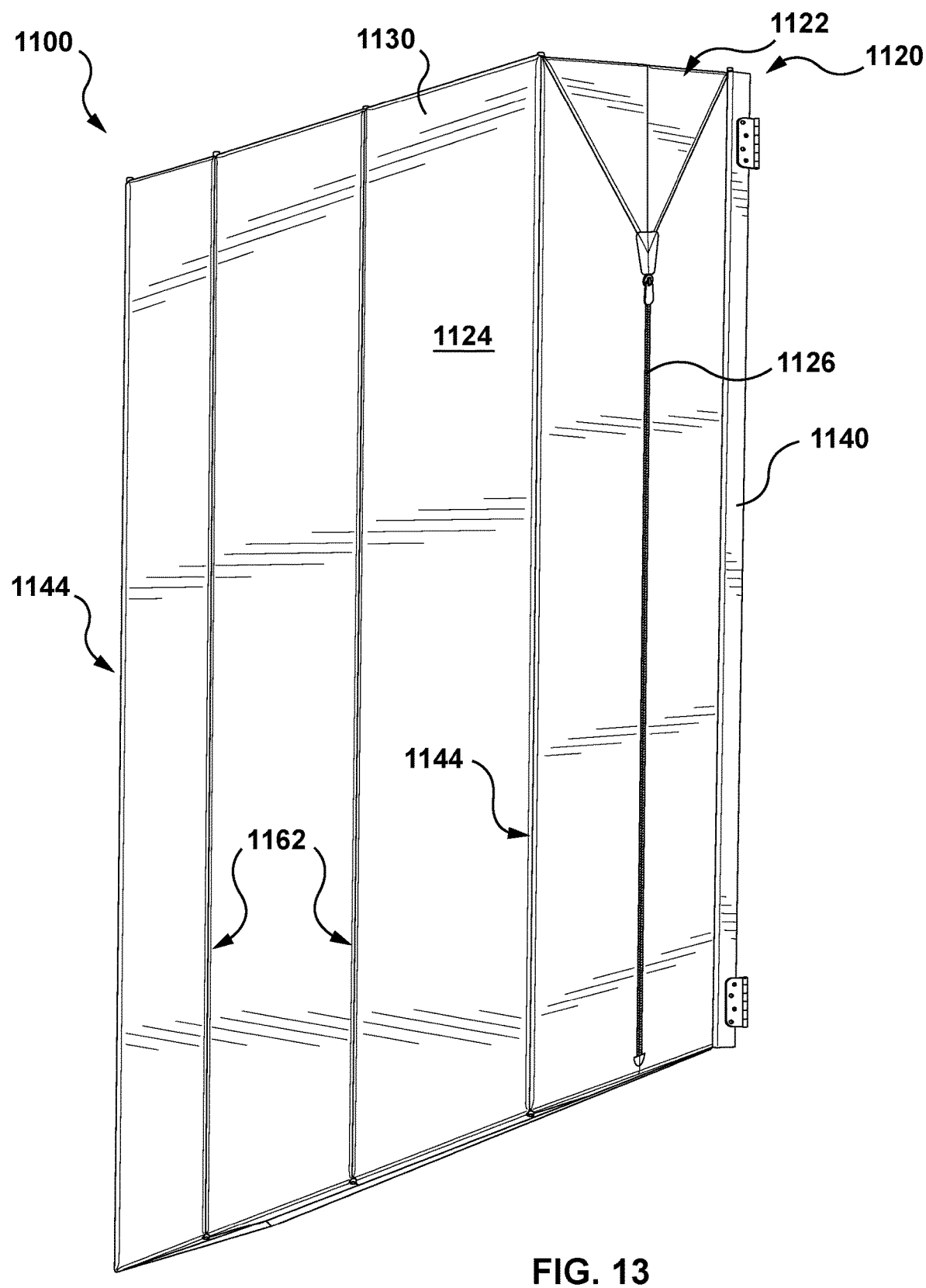
FIG. 13 is an inner side rear perspective view of the boattail embodiment in an extended configuration.
Figure 14:
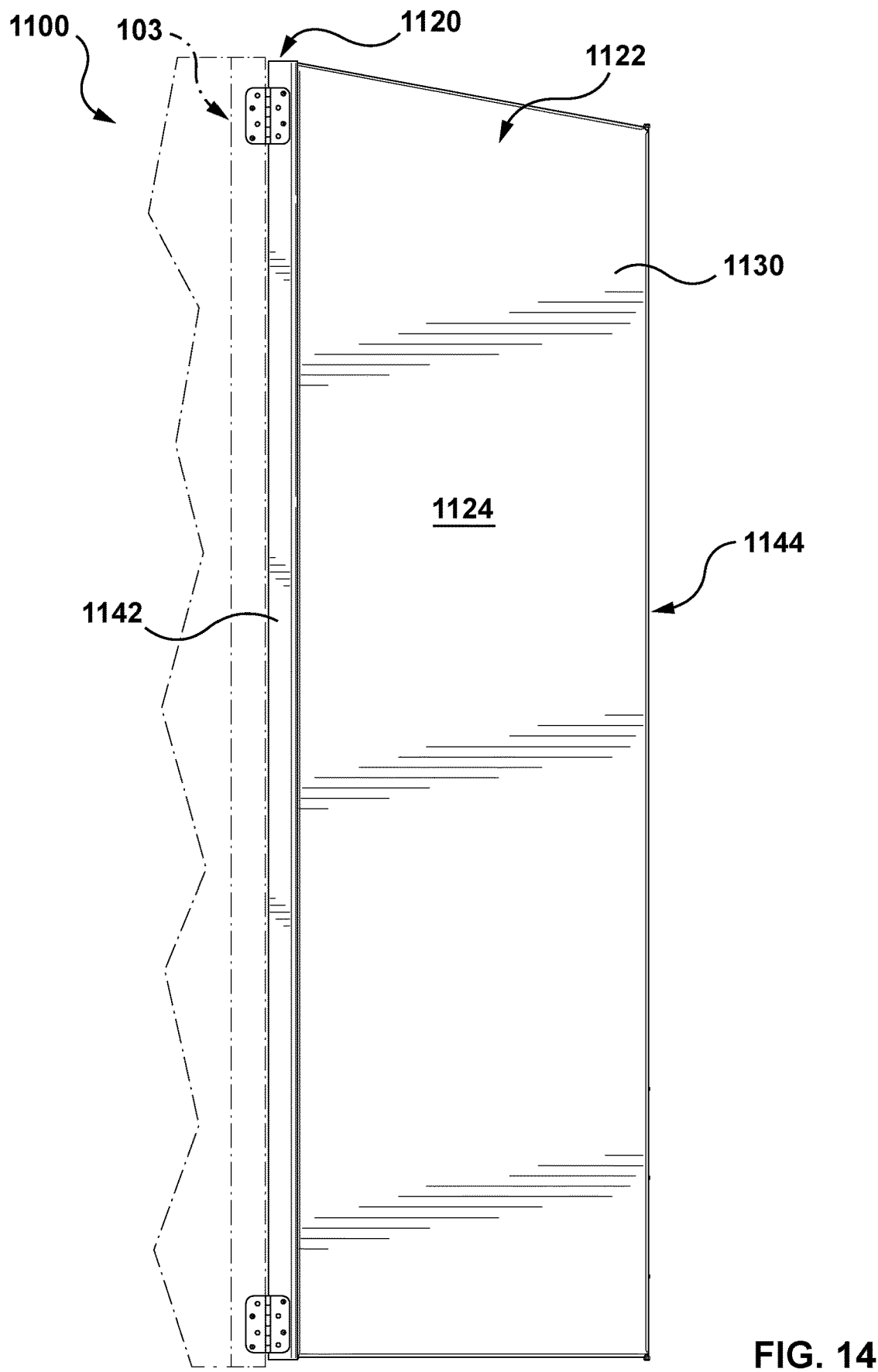
FIG. 14 is an outer side elevation view of the boattail embodiment in an extended configuration.
Figure 15:
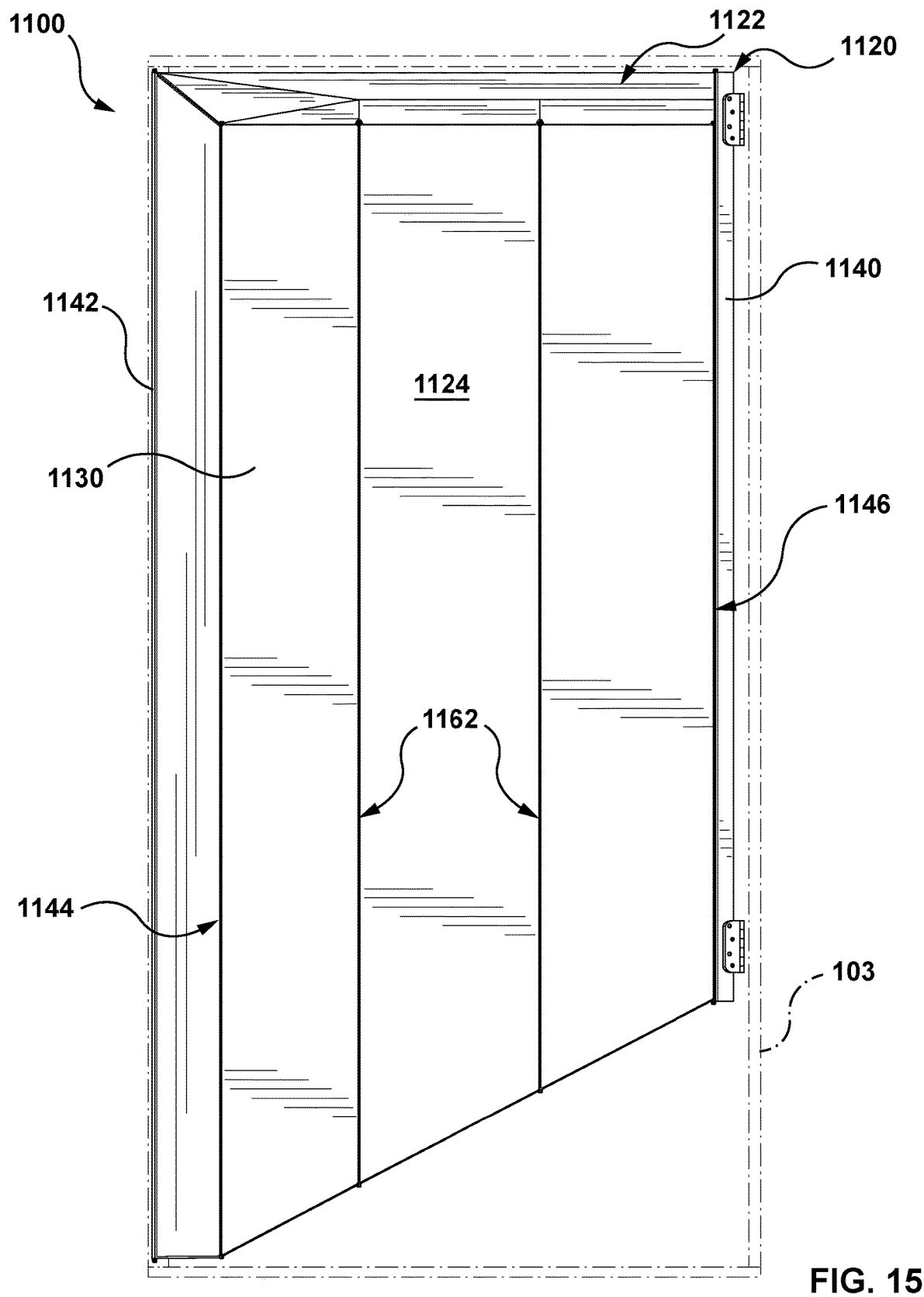
FIG. 15 is an end elevation view of the boattail embodiment in an extended configuration.
Figure 16:
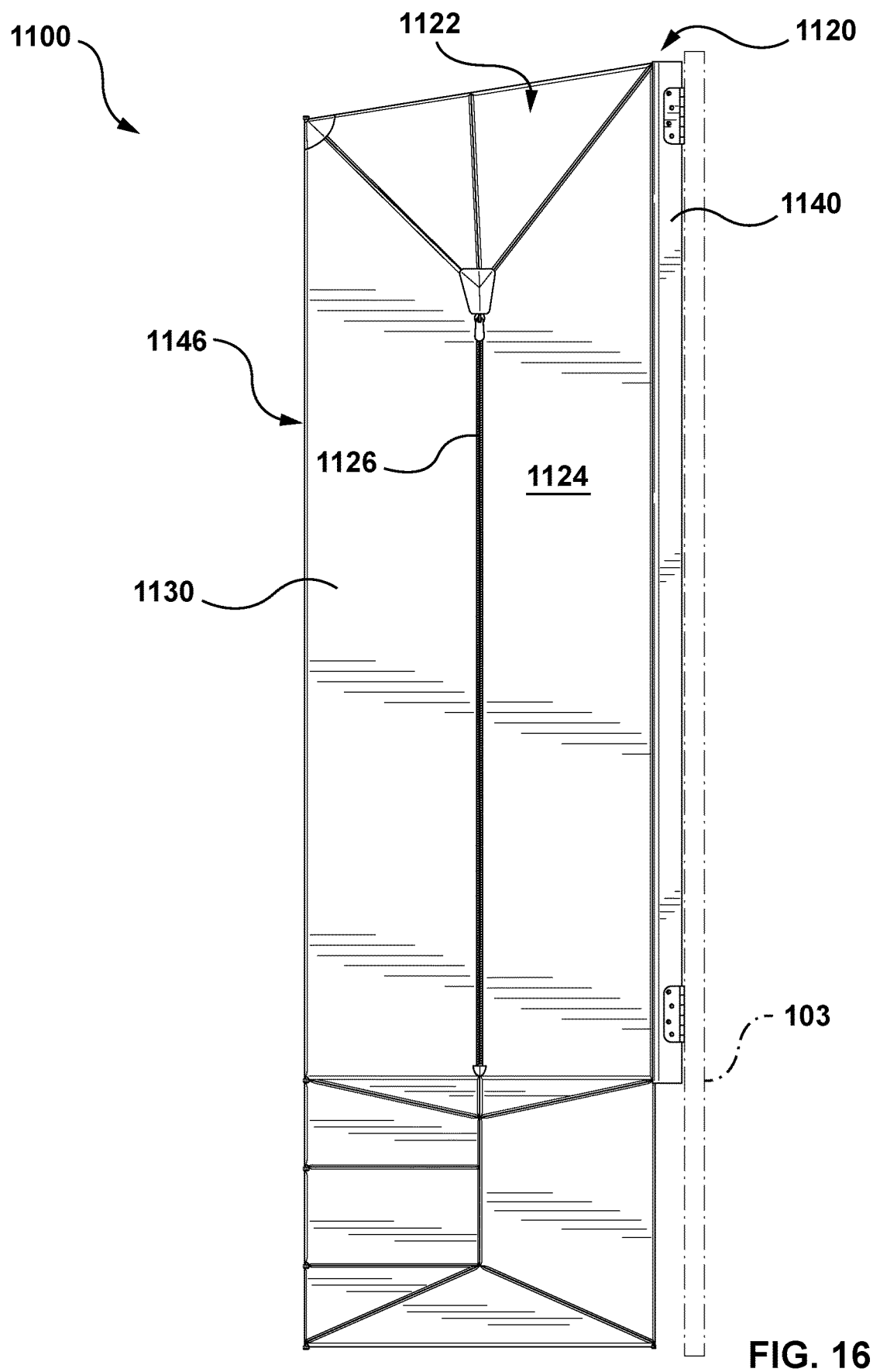
FIG. 16 is an inner side elevation view of the boattail embodiment in an extended configuration.
Figure 17:
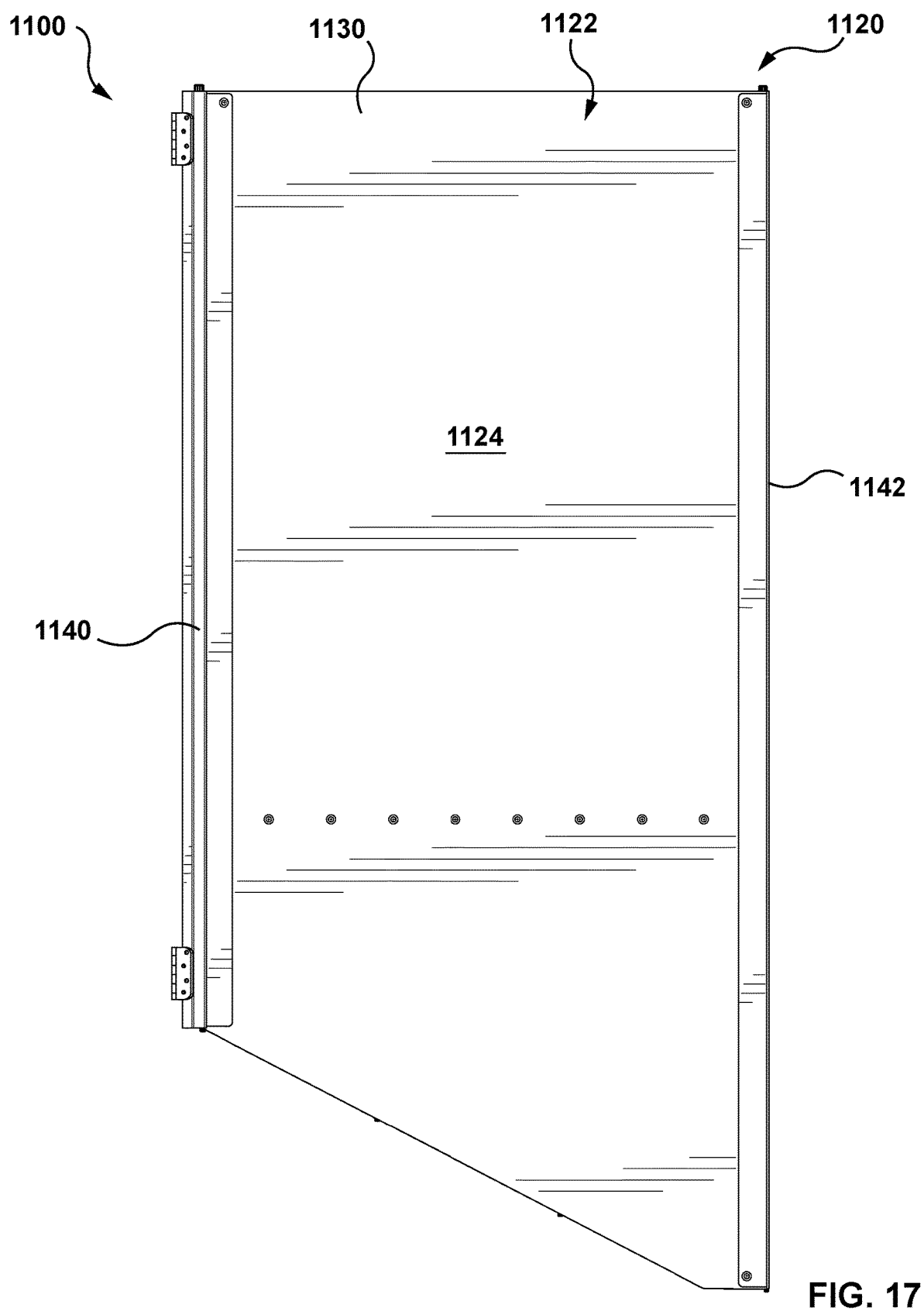
FIG. 17 is a mounting side elevation view of the boattail embodiment in an extended configuration.
Figure 18:
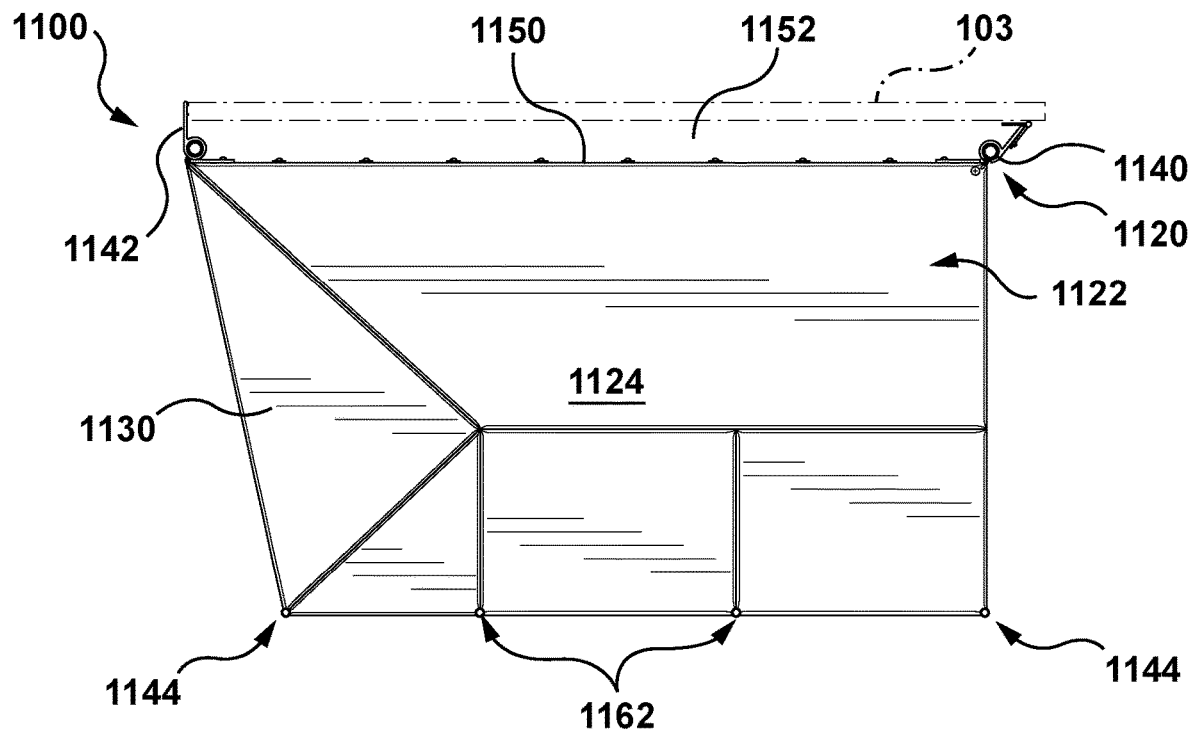
FIG. 18 shows a top plan view of the boattail embodiment in an extended configuration.
Figure 19:
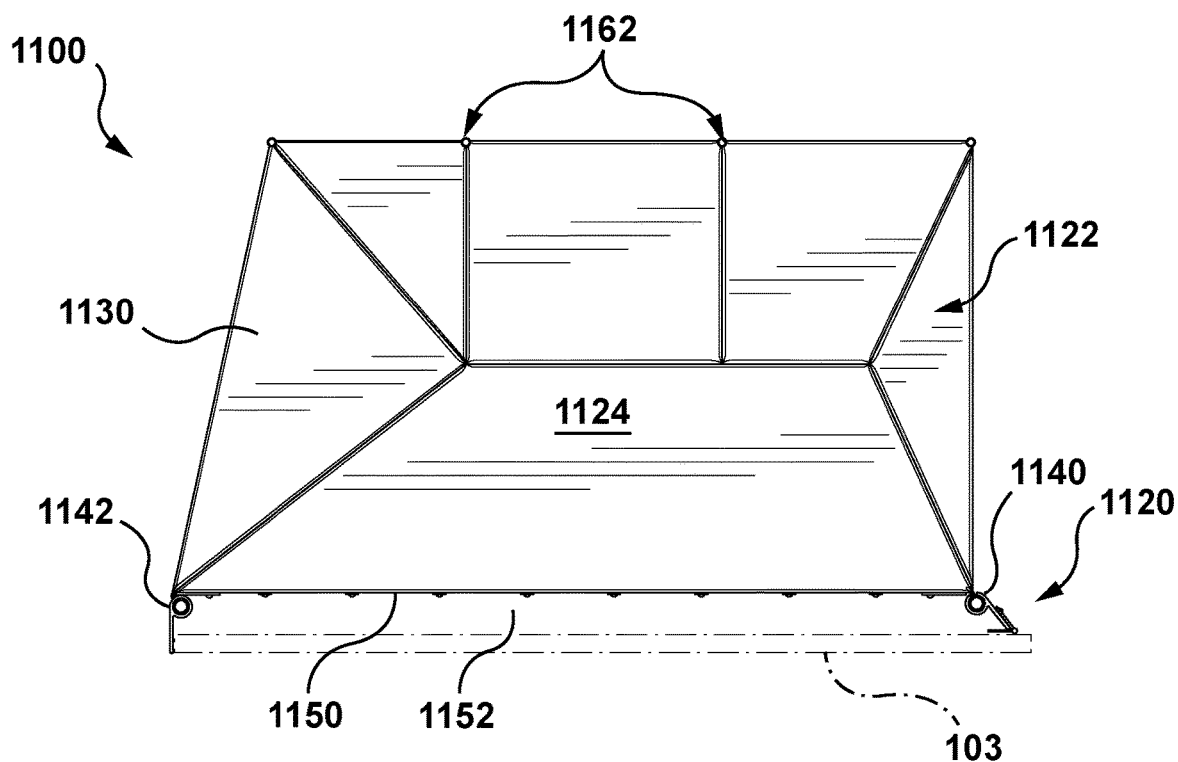
FIG. 19 shows a bottom plan view of the boattail embodiment in an extended configuration.

Similar principles may be applied to the construction of a boattail fairing or a gap fairing, an illustrative example of which will now be described with reference to FIGS. 11 to 26, which show a boattail embodiment of a fairing according to the present disclosure, denoted generally by reference 1100. FIG. 11 is a rear view of a trailer 102 of a transport truck assembly 104 with the boattail 1100 affixed to the left rear door 103 of the trailer 102 in an extended configuration. FIG. 12 is a top plan view of an aft portion of the trailer 102 with boattails 1100 affixed to each rear door. The boattail 1100 affixed to the left rear door 103 is shown in the extended configuration and the boattail 1100 affixed to the right rear door is shown in the retracted configuration. FIG. 13 is an inside rear perspective view of the boattail 1100 in an extended configuration. FIG. 14 is an outer side elevation view of the boattail 1100 in an extended configuration. FIG. 15 is an end elevation view of the boattail 1100 in an extended configuration. FIG. 16 is an inner side elevation view of the boattail 1100 in an extended configuration. FIG. 17 is a mounting side elevation view of the boattail 1100 in an extended configuration. FIG. 18 shows a top plan view of the boattail 1100 in an extended configuration and FIG. 19 shows a top plan view of the boattail 1100 in an extended configuration.

While a boattail fairing is shown and described for purposes of illustration, the same construction can be used for a gap fairing. The boattail and gap fairings are truncated pyramidal structures having gently arced surfaces when pressurized and comprising rigid structural elements supporting sheeting to form an enclosure having a top surface, a lateral surface, a medial surface, a lower surface, a base surface and an outer surface. The boattail and gap fairings can be essentially the same, and merely mounted on opposite ends of the trailer and facing in opposite directions.

Figure 24:
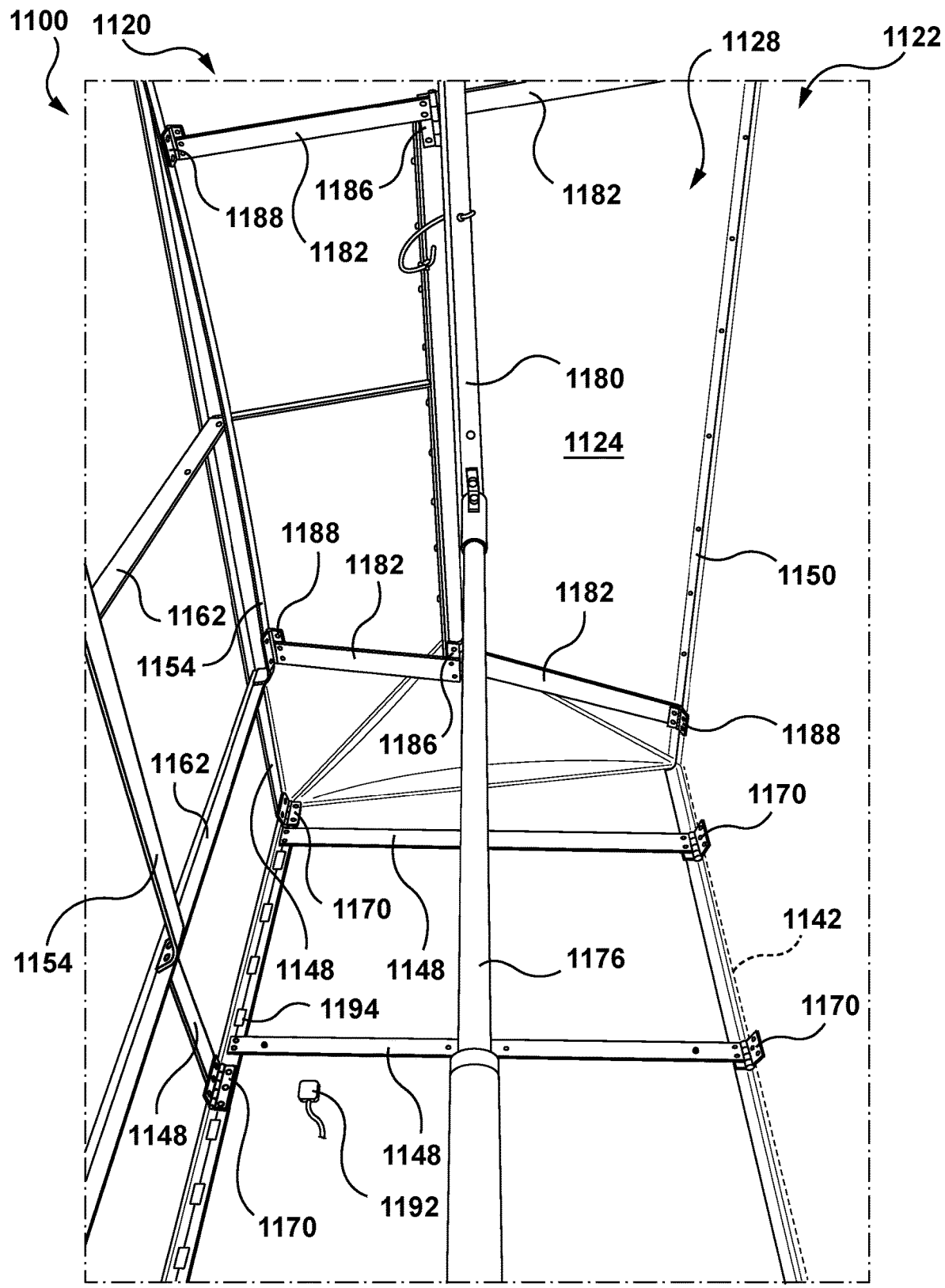
FIG. 24 shows an interior perspective view of an upper outer portion of the boattail embodiment.
Figure 25:
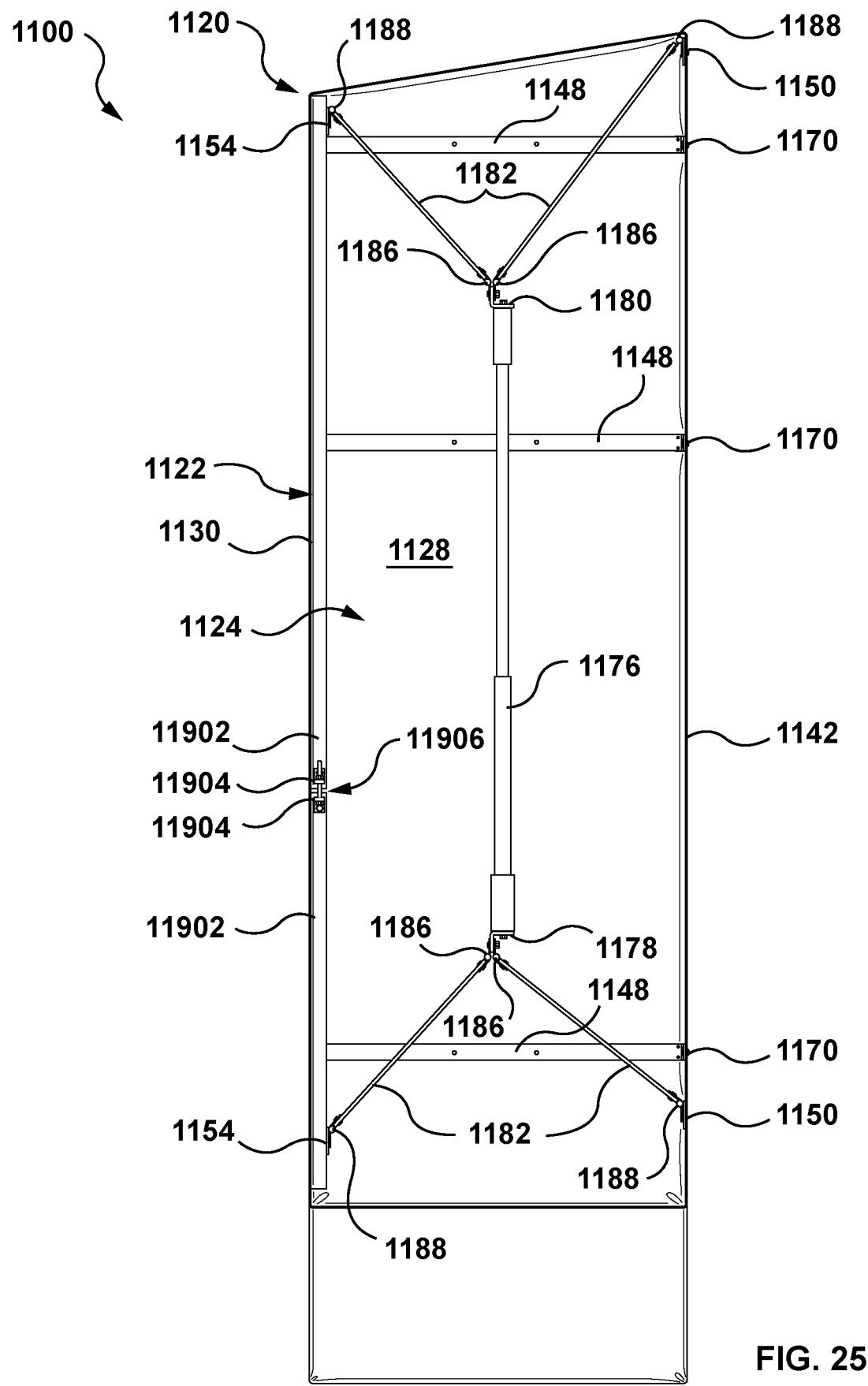
FIG. 25 is a cut-away side elevation view of the boattail embodiment in the extended configuration.
Figure 26:
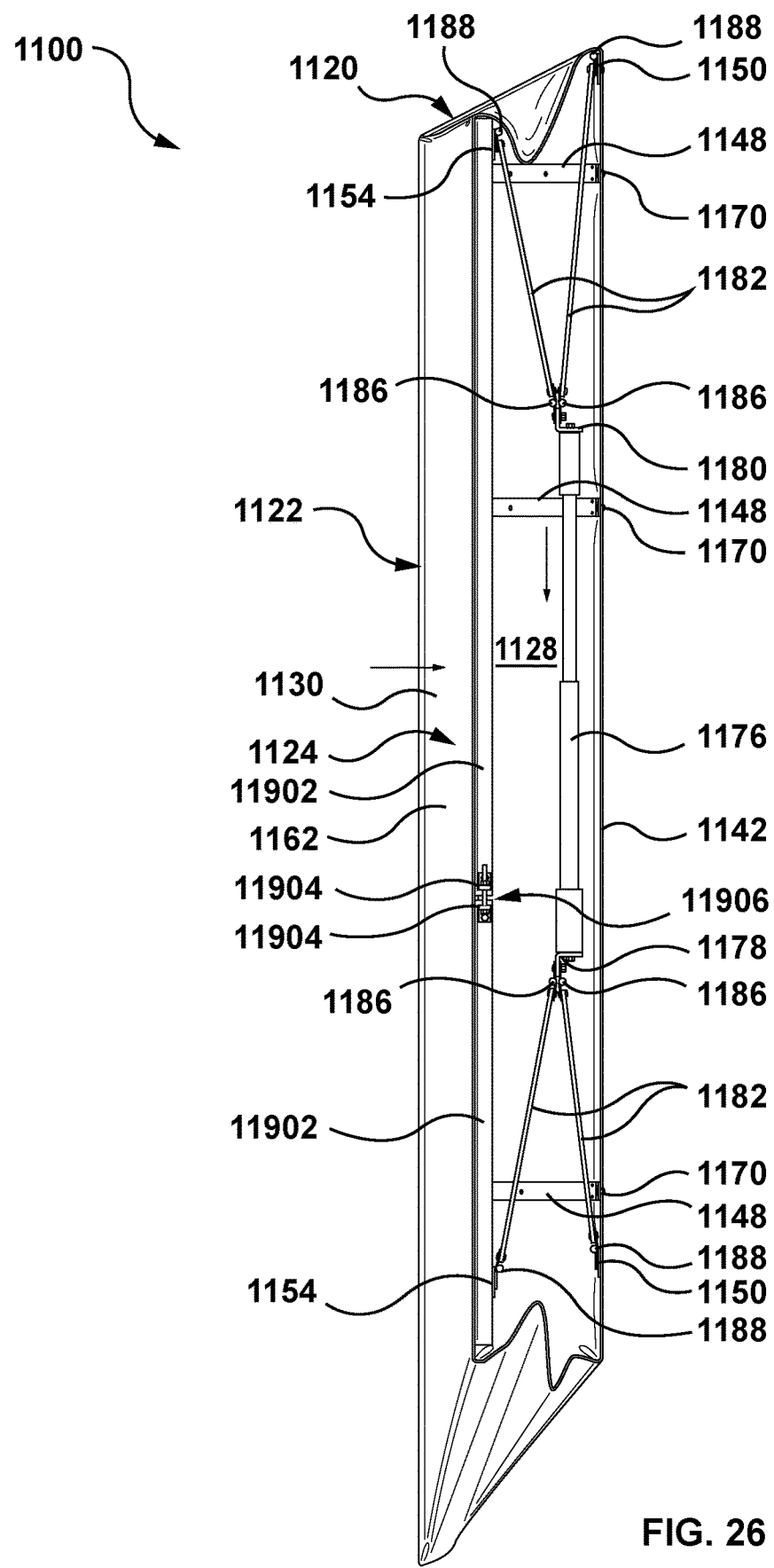
FIG. 26 is a cut-away side elevation view of the boattail embodiment in the retracted configuration.

Reference is now made in particular to FIGS. 24 to 26. FIG. 24 shows an interior perspective view of an upper outer portion of the boattail 1100, FIG. 25 is a cut-away side elevation view of the boattail 1100 in the extended configuration and FIG. 26 is a cut-away side elevation view of the boattail embodiment in the retracted configuration. The boattail 1100 comprises a structural frame 1120 comprising a plurality of rigid structural members. An enclosure 1122 formed from flexible sheeting 1124, such as, for example, a fabric, a plastic sheet, or a coated fabric, is supported by and coupled to the structural frame 1120. The sheeting 1124 is preferably monolithic, and a zipper 1126 provides access to the interior 1128 of the boattail 1100. The enclosure 1122 is adapted to be internally pressurized, for example by ram air, and forms an outer surface 1130 of the boattail 1100.

The rigid structural members include edge members and internal members. In the illustrated embodiment, the edge members comprise an inner mounting member 1140, an outer mounting member 1142, an outer distal edge member 1144 and an inner distal edge member 1146. The various edge members may be formed as rod-in channel extrusions and affixed to the sheeting 1124 analogously to the manner described above in the context of FIG. 10A. The internal members comprise longitudinally extending ribs 1162, also formed as rod-in channel extrusions affixed to the interior of the enclosure 1122, and bridging members 1148 extending between respective ones of the inner mounting member 1140, outer mounting member 1142, outer distal edge member 1144, inner distal edge member 1146, and bridging members 1148.

Upper and lower mounting side bracing members 1150 extend between and are rigidly coupled to the inner mounting member 1140 and outer mounting member 1142, and together with the inner mounting member 1140 and outer mounting member 1142, form a rigid subframe adapted to be fixedly secured on the trailer 102. As best shown in FIG. 12, the inner mounting member 1140 is adapted for mounting onto the door 103 of the trailer, and the outer mounting member 1142 is adapted for pivotal, for example hinged, mounting onto the side of the trailer 102 adjacent the door 103, with clearance 1152 between the door 103 and the enclosure 1122. This arrangement avoids interference with operation of the door 103. A six-sided enclosure form of boattail 1100 as described herein, with front and back surfaces, recovers air pressure onto the back surface of the device with no requirement for any air sealing at the trailer-boattail junction. Any vacuum that is generated in the clearance 1152 between the door 103 of the trailer 102 and the boattail 1100 acts equally and oppositely with a net zero effect. Another advantage of an enclosed boattail design is that the back surface structure functions essentially as struts for the top and side airflow surfaces while facilitating the internal folding mechanism described herein and protecting it from the outside environment.

The outer distal edge member 1144, inner distal edge member 1146, longitudinally extending ribs 1162 and bridging members 1148 form a folding subframe that folds relative to the a rigid subframe. The rigid subframe and the folding subframe are pivotally, for example hingedly, coupled to one another so that the structural frame 1120 is foldably movable between a collapsed configuration, shown on the right side of FIG. 12 and in FIGS. 21, 23 and 26, and an expanded configuration as shown in FIG. 11, on the left side of FIG. 12, and in FIGS. 13 to 20, 24 and 25. In the illustrated embodiment, the pivotal coupling is achieved by hinges 1170, which couple the bridging members 1148 to respective ones of the outer distal edge member 1144, inner distal edge member 1146 and longitudinally extending ribs 1162; the hinges 1170 are located where folding occurs. A plurality of distal side bracing members 1154 extend from the inner distal edge member 1146 to the outermost longitudinal rib 1162 and are rigidly coupled thereto, but do not extend to the outer distal edge member 1144. Instead, the outermost longitudinal rib 1162 is pivotally, for example hingedly, coupled to the outer distal edge member 1144 by bridging members 1148.

A linear actuator 1176 acts between the subframes and is adapted to move the structural frame 1120 between the expanded configuration and the collapsed configuration. In the illustrated embodiment, each end of the linear actuator 1176 is coupled to one of the internal pivotally connected rigid structural members. More particularly, in the illustrated embodiment the linear actuator 1176 is fixed at opposite ends to upper and lower actuator bars 1178, 1180. The actuator bars 1178, 1180 are pivotally coupled by hinges 1186 to tensioning bars 1182, which are in turn pivotally coupled by hinges 1188 to respective ones of the uppermost and lowermost distal side bracing members 1154 and the upper and lower mounting side bracing members 1150.

Figure 20:
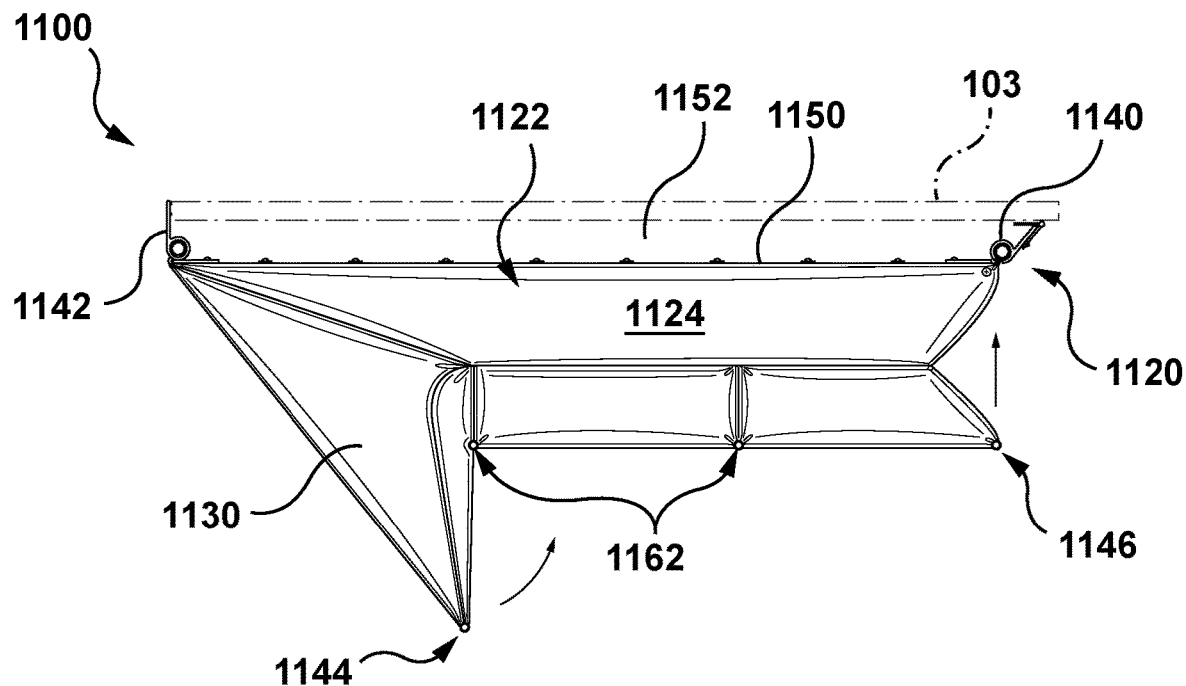
FIG. 20 shows a top plan view of the boattail embodiment transitioning from the extended configuration to the retracted configuration.
Figure 21:
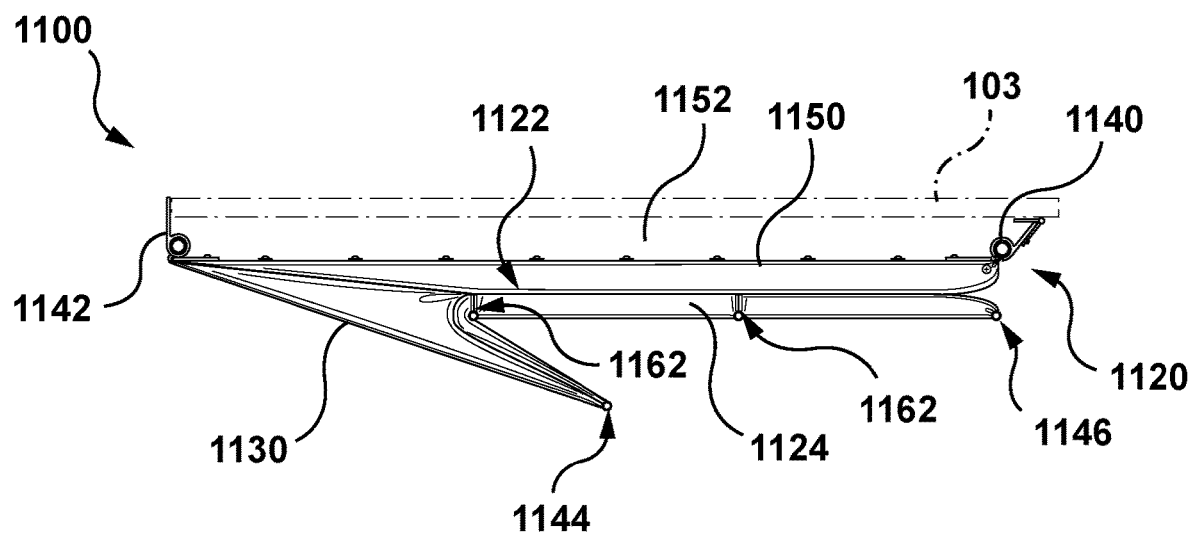
FIG. 21 shows a top plan view of the boattail embodiment in the retracted configuration.
Figure 22:
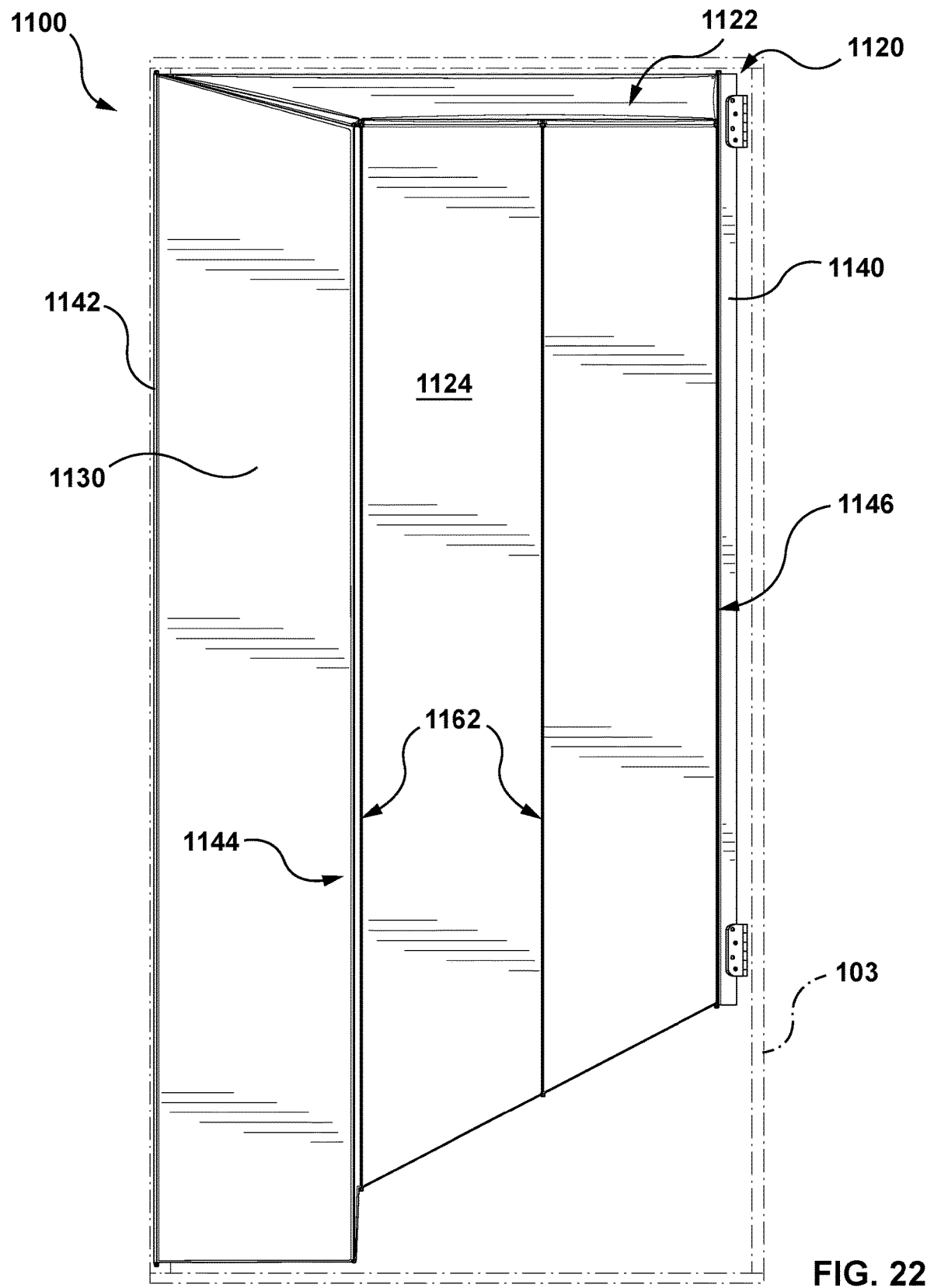
FIG. 22 shows an end elevation view of the boattail embodiment transitioning from the extended configuration to the retracted configuration.
Figure 23:
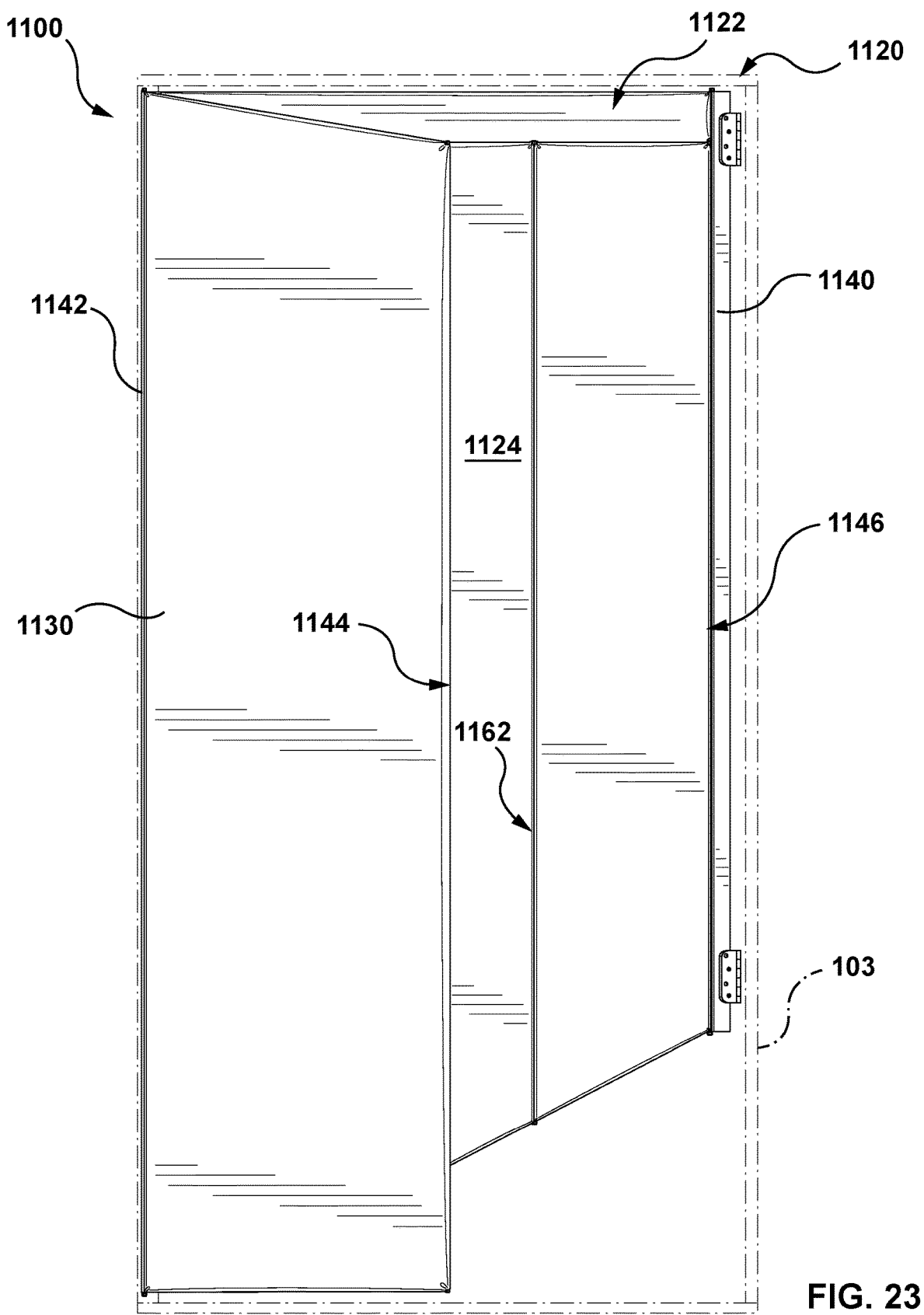
FIG. 23 shows an end elevation view of the boattail embodiment in the retracted configuration.

Extension of the linear actuator 1176 forces the tensioning bars 1182 to pivot away from one another. This in turn forces the distal side bracing members 1154 and hence the outer distal edge member 1144, inner distal edge member 1146 and longitudinally extending ribs 1162 away from the upper and lower mounting side bracing members 1150 and hence away from the inner mounting member 1140 and outer mounting member 1142. This moves the structural frame 1120 into the expanded configuration, as shown in FIG. 25. Retraction of the linear actuator 1176 will cause the tensioning bars 1182 to pivot toward one another, drawing the distal side bracing members 1154 and hence the outer distal edge member 1144, inner distal edge member 1146 and longitudinally extending ribs 1162, toward the upper and lower mounting side bracing members 1150 and hence toward the inner mounting member 1140 and outer mounting member 1142, to move the structural frame 1120 into the collapsed configuration, as shown in FIG. 26. The outer distal edge member 1144 moves through an arc inwardly past the outermost longitudinally extending rib 1162 and toward the mounting side bracing members 1150. FIG. 18 shows a top plan view of the boattail 1100 in an extended configuration, FIG. 20 shows a top plan view of the boattail 1100 transitioning from the extended configuration to the retracted configuration, and FIG. 21 shows a top plan view of the boattail 1100 in the retracted configuration. Similarly, FIG. 15 shows an end elevation view of the boattail 1100 in an extended configuration, FIG. 22 shows an end elevation view of the boattail 1100 transitioning from the extended configuration to the retracted configuration, and FIG. 21 shows an end elevation view of the boattail 1100 in the retracted configuration.

The enclosure 1122 is supported by and coupled to the structural frame 1120 so that the enclosure 1122 moves with the structural frame 1120 and unfolds when the structural frame 1120 moves from the collapsed configuration to the expanded configuration, and folds in upon itself when the structural frame 1120 moves from the expanded configuration to the collapsed configuration. When the structural frame 1120 is in the expanded configuration the boattail 1100 is in the extended configuration and when the structural frame 1120 is in the collapsed configuration, the boattail 1100 is in the retracted configuration.

When the structural frame 1120 moves into the expanded configuration, as shown in FIG. 25, the structural frame 1120 develops tension on at least part of the sheeting 1124 so that when the enclosure 1122 is pressurized, the outer surface 1130 of the enclosure 1122 is structurally stiff, and conforms to a predefined aerodynamic shape and is substantially free of airflow-induced vibration when the fairing is subjected to turbulent airflow. When the linear actuator 1176 is retracted to move the structural frame 1120 into the collapsed configuration, as shown in FIG. 26, tension is released from the sheeting 1124.

As with the trailer skirt 100, the linear actuator 1176 in the boattail 1100 may be configured to be responsive to a speed sensor.

Also similar to the trailer skirt 100, the boattail 1100 may include tensioning elements, preferably adjustable tensioning elements, interposed between adjacent rigid structural members for tensioning the enclosure 1122. For example, as shown in FIGS. 25 and 26, the longitudinally extending ribs 1162 may be formed in segments 11902 oriented end-to-end and joined by brackets 11904 and nut-and-bolt assemblies 11906 that apply tension between adjacent segments so that the longitudinally extending ribs 1162 apply tension to the enclosure 1122 to de-wrinkle the sheeting 1124. A similar approach may be used with other rigid structural elements.

Additional reinforcement may be provided by internal inelastic cords in a manner analogous to that described for the trailer skirt 100, although in the boattail 1100 three looped cords may be used instead of seven.

As with the trailer skirt 100, the boattail 1100 may also carry one or more sensor elements and/or light sources. FIG. 24 shows illustrative positioning of an illustrative sensor element 1192 and LED light strip 1194 carried by the sheeting 124; other mounting positions and configurations are also possible.

Certain illustrative embodiments have been described by way of example. It will be apparent to persons skilled in the art that a number of variations and modifications can be made without departing from the scope of the claims.

LISTING OF REFERENCE NUMERALS

100 Trailer skirt
102 Trailer
103 Trailer door
104 Transport truck assembly
106 Cab
110 Safety guard section of trailer skirt
112 Aerodynamic section of trailer skirt
120 Structural frame of trailer skirt
122 Enclosure of trailer skirt
124 Flexible sheeting
126 Zipper
128 Interior of trailer skirt
130 Outer surface of trailer skirt
132 Leading portion of trailer skirt
134 Trailing portion of trailer skirt
136 Inner wing portion of trailer skirt
138 Outer wing portion of trailer skirt
140 Forward lower edge member
142 Aft lower edge member
144 Leading edge member
146 Inner side wing member
148 Outer side wing member
150 Inner side trailing member
152 Forward inner upper edge member
154 Forward outer upper edge member
156 Aft inner upper edge member
158 Aft outer upper edge member
160 Short loop of cable
162 Longitudinally extending ribs
164 Safety guard section bracing struts
166 Aerodynamic section bracing struts
168 L-brackets
172 Angle member of L-bracket
174 Inwardly extending lever arm of L-bracket
176 Linear actuator
178 Inner top surface of the enclosure
180 Cable and pulley system
184 Cabling of cable and pulley system
186 Pulleys
188 Support cable
190 Reinforcement plate
192 Inelastic cords
194 Ram air intake
902 Segments of longitudinally extending ribs
904 Brackets on longitudinally extending ribs
906 Nut-and-bolt assemblies
908 Brackets on forward lower edge member and aft lower edge member
910 Bolts
912 Sleeved spring
914 Guide bolt
920 Channel extrusions
922 Rigid rods
924 Channels in channel extrusions
926 Bolt at end of channel extrusion
930 Interior volume of enclosure
932 Outer surface of enclosure
934 Airflow boundary layer
936 Airflow within airflow boundary layer
938 Freestream airflow
940 Ram air intake inlet
942 Ram air intake airflow passage
944 Ram air intake outlet
946 Innermost edge of ram air intake inlet
948 Fasteners
1100 Boattail
1120 Structural frame of boattail
1122 Enclosure of boattail
1124 Flexible sheeting
1126 Zipper
1128 Interior of boattail
1130 Outer surface of boattail
1140 Inner mounting member
1142 Outer mounting member
1144 Outer distal edge member
1146 Inner distal edge member
1148 Bridging members
1150 Mounting side bracing members
1152 Clearance
1154 Distal side bracing members
1162 Longitudinally extending ribs
1170 Hinges
1176 Linear actuator
1178 Upper actuator bar
1180 Lower actuator bar
1182 Tensioning bars
1186 Hinges
1188 Hinges
1192 Sensor element
1194 LED light strip
1196 LED backlight
11902 Segments of longitudinally extending ribs
11904 Brackets on longitudinally extending ribs
11906 Nut-and-bolt assemblies

What is claimed is:

1. A deployable fairing for a transport vehicle, comprising:

an enclosure formed from flexible sheeting and forming an outer surface;

the enclosure being adapted to be internally pressurized;

a structural frame comprising a plurality of rigid structural members;

the structural frame comprising at least two subframes;

the subframes being pivotally coupled to one another so that the structural frame is foldably movable between a collapsed configuration and an expanded configuration;

an actuator acting between the subframes and adapted to move the structural frame between the expanded configuration and the collapsed configuration;

the enclosure being supported by and coupled to the structural frame so that the enclosure moves with the structural frame and unfolds when the structural frame moves from the collapsed configuration to the expanded configuration and folds in upon itself when the structural frame moves from the expanded configuration to the collapsed configuration;

wherein:

movement of the structural frame from the collapsed configuration to the expanded configuration develops tension on at least a portion of the outer surface of the enclosure; and movement of the structural frame from the expanded configuration to the collapsed configuration releases the tension;

whereby, when the enclosure is internally pressurized while the structural frame is in the expanded configuration, the outer surface of the enclosure is structurally stiff and conforms to a predefined aerodynamic shape.

2. The fairing of claim 1, wherein the structural frame comprises a rigid subframe adapted to be fixedly secured on the transport vehicle and a folding subframe that folds relative to the transport vehicle.

3. The fairing of claim 2, wherein when the enclosure is internally pressurized while the structural frame is in the collapsed configuration, a portion of the outer surface of the enclosure surrounding the rigid subframe is structurally stiff and maintains conformity with its corresponding portion of the predefined aerodynamic shape.

4. The fairing of claim 1, wherein the enclosure is formed from a monolithic sheet.

5. The fairing of claim 1, wherein the actuator is configured to be responsive to a speed sensor.

6. The fairing of claim 1, wherein tensioning elements are interposed between adjacent rigid structural members for tensioning the enclosure.

7. The fairing of claim 6, wherein the tensioning elements are adjustable tensioning elements.

8. The fairing of claim 1, wherein:

the sheeting is translucent; and at least one light source is disposed within the enclosure for substantially uniformly illuminating the outer surface of the enclosure.

9. The fairing of claim 1, wherein at least one sensor element is carried by the enclosure.

10. The fairing of claim 9, wherein the at least one sensor element is disposed within the enclosure.

11. The fairing of claim 1, wherein the rigid structural members are internally anchored by inelastic cords.

12. The fairing of claim 1, wherein:

the fairing is a boattail fairing;

the rigid structural members comprise an inner mounting member and an outer mounting member;

the inner mounting member is adapted for mounting onto a door of a trailer;

the outer mounting member is adapted for pivotal mounting onto a side of the trailer adjacent the door;

wherein, when the fairing is mounted on the trailer, there is clearance between the door and the enclosure whereby the fairing is non-interfering with operation of the door.

13. The fairing of claim 1, wherein:

the fairing is a trailer skirt;

the fairing comprises an upper safety guard section comprising a first one of the subframes and which remains fixed in position relative to the transport vehicle; and a lower aerodynamic section comprising a second one of the subframes and which, relative to the upper safety guard section, retracts and extends.

14. A fairing for a transport vehicle, comprising:

an enclosure formed from flexible sheeting and forming an outer surface;

the enclosure being adapted to be internally pressurized;

a structural frame comprising a plurality of rigid structural members;

the enclosure being supported by and coupled to the structural frame so that when the enclosure is internally pressurized, the outer surface of the enclosure is structurally stiff and conforms to a predefined aerodynamic shape;

wherein at least some of the rigid structural members are coupled to one another end-to-end by tensioning elements whereby those rigid structural members apply tension to the enclosure to de-wrinkle the sheeting.

15. A fairing for a transport vehicle, comprising:

an enclosure formed from flexible sheeting and forming an outer surface;

the enclosure defining an internal volume and being adapted to be internally pressurized;

wherein, when the enclosure is internally pressurized, the outer surface of the enclosure is structurally stiff and conforms to a predefined aerodynamic shape; and a ram air intake in fluid communication with the interior volume, wherein:

during forward motion of the transport vehicle, the outer surface defines an airflow boundary layer having relatively slower airflow than freestream airflow spaced outwardly from the airflow boundary layer relative to the outer surface, whereby the airflow boundary layer is disposed between the outer surface and the freestream airflow;

the ram air intake extends from the outer surface beyond the airflow boundary layer into the freestream airflow and has an inlet disposed within and facing the freestream airflow;

the inlet communicating along an airflow passage with an outlet into the internal volume;

wherein a cross-sectional area of the outlet is substantially larger than a cross-sectional area of the inlet and a cross-sectional area of the airflow passage expands from the inlet toward the outlet.

16. The fairing of claim 15, wherein the airflow passage curves inwardly toward the outer surface from the inlet toward the outlet.

17. The fairing of claim 15, further comprising:

a structural frame comprising a plurality of rigid structural members;

wherein the enclosure is supported by and coupled to the structural frame.

18. The fairing of claim 14, wherein at least one sensor element is carried by the enclosure.

19. The fairing of claim 18, wherein the at least one sensor element is disposed within the enclosure.

* * * * *